United States Patent [19]
Kim et al.

(10) Patent No.: US 11,614,364 B2
(45) Date of Patent: Mar. 28, 2023

(54) LONG-WAVE INFRARED DETECTING ELEMENT, LONG-WAVE INFRARED DETECTING ELEMENT ARRAY STRUCTURE, LONG-WAVE INFRARED TEMPERATURE DETECTING DEVICE, AND THERMAL IMAGING DEVICE

(71) Applicant: SAMSUNG ELECTRONICS CO., LTD., Suwon-si (KR)

(72) Inventors: Dongkyun Kim, Suwon-si (KR); Hyuck Choo, Yongin-si (KR)

(73) Assignee: SAMSUNG ELECTRONICS CO., LTD., Suwoon-si (KR)

( * ) Notice: Subject to any disclaimer, the term of this patent is extended or adjusted under 35 U.S.C. 154(b) by 0 days.

(21) Appl. No.: 17/386,144

(22) Filed: Jul. 27, 2021

(65) Prior Publication Data
US 2022/0178754 A1 Jun. 9, 2022

(30) Foreign Application Priority Data
Dec. 4, 2020 (KR) .................. 10-2020-0168726

(51) Int. Cl.
*G01J 5/02* (2022.01)
*G01J 5/08* (2022.01)
(Continued)

(52) U.S. Cl.
CPC ............. *G01J 5/024* (2013.01); *G01J 5/0255* (2013.01); *G01J 5/06* (2013.01); *G01J 5/0853* (2013.01); *G01J 2005/0077* (2013.01)

(58) Field of Classification Search
CPC ...... G01J 5/024; G01J 2005/0077; G01J 5/06; G01J 5/0853; G01J 5/20
See application file for complete search history.

(56) References Cited

U.S. PATENT DOCUMENTS 2,222,425 A  11/1940 Wehe
3,513,313 A   5/1970 Schwartz
(Continued)

FOREIGN PATENT DOCUMENTS

JP  2000-508770 A  7/2000
JP     5596848 B2  9/2014
(Continued)

OTHER PUBLICATIONS

Bell Technologies, Inc. Hall sensor catalog, 19 pages (Year: 2002).*
(Continued)

*Primary Examiner* — David P Porta
*Assistant Examiner* — Jeremy S Valentiner
(74) *Attorney, Agent, or Firm* — Sughrue Mion, PLLC

(57) ABSTRACT

A long-wave infrared detecting element includes a magnetic field generator configured to generate a magnetic field; a substrate on the magnetic field generator; a superparamagnetic material layer disposed to be separated from the substrate and magnetized by the magnetic field generated by the magnetic field generator; a support unit on the substrate to support the superparamagnetic material layer such that the superparamagnetic material layer separated from the substrate, such that the support unit and the superparamagnetic material layer generate heat by absorbing infrared radiation from the outside; and a magneto-electric conversion unit that generates an electrical signal proportional to both a strength of the magnetic field generated by the magnetic field generator and the magnetization of the superparamagnetic material layer.

24 Claims, 24 Drawing Sheets

(51) Int. Cl.
*G01J 5/06* (2022.01)
*G01J 5/00* (2022.01)

(56) References Cited

U.S. PATENT DOCUMENTS

| | | | |
|---|---|---|---|
| 3,727,053 A | 4/1973 | Walser et al. | |
| 4,667,157 A * | 5/1987 | Ciammaichella | G01N 27/74 73/23.31 |
| 5,698,852 A * | 12/1997 | Tanaka | G01J 5/22 348/308 |
| 5,722,317 A | 3/1998 | Ghiron et al. | |
| 6,576,904 B1 * | 6/2003 | Volkening | G01K 17/003 374/E17.002 |
| 8,498,837 B2 | 7/2013 | Liu et al. | |
| 10,120,195 B1 * | 11/2018 | Bossert | G02B 27/1066 |
| 2009/0180516 A1 * | 7/2009 | Den Toonder | G01K 5/486 374/E5.03 |
| 2012/0081111 A1 | 4/2012 | Kim et al. | |
| 2017/0268936 A1 | 9/2017 | Rivadulla Fernández et al. | |

FOREIGN PATENT DOCUMENTS

| | | |
|---|---|---|
| KR | 10-2010-0104396 A | 9/2010 |
| KR | 10-2017-0045252 A | 4/2017 |

OTHER PUBLICATIONS

Castellanos Rubio et al. The impact of the chemical synthesis on the magnetic properties of intermetallic PdFe nanoparticles, Journal of Nanoparticle Research vol. 17, Article No. 229, 13 pages (Year: 2015).*

H. Amekura et al., "Curie transition of superparamagnetic nickel nanoparticles in silica glass: A phase transition in a finite size system", Physical Review B, 71, 172404, DOI: 10.1103/PhysRevB. 71.172404, May 2005, 4 pages total.

Chao Liu et al., "Size-Dependent Superparamagnetic Properties of Mn Spinel Ferrite Nanoparticles Synthesized from Reverse Micelles", Chem. Mater., vol. 13, No. 6, Jun. 2001, 5 pages total.

T. Yoshida et al., "Construction of Magnetic Infrared Sensor Utilizing Ferrimagnetic Film", IEEE Transactions on Magnetics, vol. 35, No. 5, Sep. 1999, 3 pages total.

* cited by examiner

LONG-WAVE INFRARED DETECTING ELEMENT, LONG-WAVE INFRARED DETECTING ELEMENT ARRAY STRUCTURE, LONG-WAVE INFRARED TEMPERATURE DETECTING DEVICE, AND THERMAL IMAGING DEVICE

CROSS-REFERENCE TO RELATED APPLICATION

This application is based on and claims priority under 35 U.S.C. § 119 to Korean Patent Application No. 10-2020-0168726, filed on Dec. 4, 2020, in the Korean Intellectual Property Office, the disclosure of which is incorporated by reference herein in its entirety.

BACKGROUND

1. Field

The disclosure relates to long-wave infrared detecting elements, long-wave infrared detecting element array structures, long-wave infrared temperature detecting devices, and thermal imaging devices, and more particularly, to long-wave infrared detecting elements, long-wave infrared detecting element array structures, long-wave infrared temperature detecting devices, and thermal imaging devices that are configured to detect long-wave infrared radiation by using a superparamagnetic material layer.

2. Description of Related Art

In order to detect infrared radiation, uncooled infrared detecting devices are widely used. The uncooled infrared detecting device may be classified into a bolometer infrared detecting device that uses a change in the electrical resistance of a material according to the temperature change of the material due to infrared absorption, a pyroelectric infrared detecting device that uses a change in the spontaneous polarization of a pyroelectric ceramic according to the amount of temperature change due to infrared absorption, and a thermopile infrared detecting device that uses an electro-motive force across two contacts of an electrically conducting material when there is a temperature difference between those two contacts due to infrared absorption.

Various types of infrared detecting devices have been applied to and used in various fields, such as non-contact temperature sensors, military night vision goggles, automotive night vision, and medical thermal imaging cameras. To this end, there is a need for an uncooled infrared detecting device which is small and light for portability and has characteristics such as low power consumption, low price, and fast response at room temperature.

SUMMARY

Provided are long-wave infrared detecting elements, long-wave infrared detecting element array structures, long-wave infrared temperature detecting devices, and thermal imaging devices that are configured to detect infrared radiation by using a phenomenon that the magnetization of a superparamagnetic material layer changes according to temperature under constant magnetic field.

Provided are long-wave infrared detecting elements including a structure in which incident infrared radiation may be efficiently converted into electrical energy in a thermo-electromagnetic conversion unit, long-wave infrared detecting element array structures including the same, long-wave infrared temperature detecting devices including the same, and thermal imaging devices including the same.

Additional aspects will be set forth in part in the description which follows and, in part, will be apparent from the description, or may be learned by practice of embodiments of the disclosure.

In accordance with an aspect of the disclosure, a long-wave infrared detecting element includes a magnetic field generator configured to generate a magnetic field; a substrate on the magnetic field generator; a superparamagnetic material layer separated from the substrate and magnetized by the magnetic field generated by the magnetic field generator; a support unit on the substrate, the support unit supporting the superparamagnetic material layer such that the superparamagnetic material layer is separated from the substrate, such that the support unit and the superparamagnetic material layer generate heat by absorbing infrared radiation from an outside; and a magneto-electric conversion unit configured to generate an electrical signal proportional to both a strength of the magnetic field generated by the magnetic field generator and a magnetization of the superparamagnetic material layer, wherein the magnetization of the superparamagnetic material layer changes according to a temperature of the superparamagnetic material layer, and wherein the temperature of the superparamagnetic material layer changes according to an amount of the infrared radiation absorbed directly by the superparamagnetic material layer and according to an amount of the infrared radiation absorbed by the support unit.

The magnetization of the superparamagnetic material layer may change linearly according to the temperature of the superparamagnetic material layer.

The magneto-electric conversion unit may include a Hall plate, a first bias electrode provided at a first edge of the Hall plate, a second bias electrode provided at a second edge of the Hall plate opposite to the first edge of the Hall plate in a first direction, at least one first detection electrode provided at a third edge of the Hall plate, and at least one second detection electrode provided at a fourth edge of the Hall plate opposite to the third edge of the Hall plate in a second direction perpendicular to the first direction, and both the first direction and the second direction may be perpendicular to a direction of the magnetic field generated by the magnetic field generator.

The support unit may include a support plate for supporting the superparamagnetic material layer, a plurality of support columns protruding from an upper surface of the substrate in a vertical direction, and a plurality of connection units wherein each of the plurality of connection units connects the support plate to an upper portion of a respective support column of the plurality of support columns, and the support plate and the plurality of support columns may be separated from each other on a plane perpendicular to the vertical direction.

Each of the plurality of connection units may have an area less than an area of the support plate.

Each of the plurality of connection units may include a respective meander pattern.

The magneto-electric conversion unit may contact an upper surface of the substrate.

The Hall plate may include a rectangular parallelepiped shape.

The support plate may include at least one of silicon oxide and silicon nitride.

The magneto-electric conversion unit may be provided on the support unit.

Each of the first bias electrode, the second bias electrode, the at least one first detection electrode, and the at least one second detection electrode may include a respective pattern extending from the Hall plate, the plurality of connection units may include a first connection unit, a second connection unit, a third connection unit, and a fourth connection unit respectively supporting the first bias electrode, the second bias electrode, the at least one first detection electrode, and the at least one second detection electrode, and the plurality of support columns may include a first support column, a second support column, a third support column, and a fourth support column respectively connected to the first to fourth connection units.

Each of the first bias electrode, the second bias electrode, the at least one first detection electrode, and the at least one second detection electrode may include a respective meander pattern.

The superparamagnetic material layer may be provided on the magneto-electric conversion unit.

The superparamagnetic material layer may be provided between the support unit and the magneto-electric conversion unit.

The long-wave infrared detecting element may further include a reflection plate on the upper surface of the substrate.

A trench may be formed in the substrate by etching a portion of the substrate, and the Hall plate may be provided on an empty space formed by the trench.

The support unit may include a support plate provided on the empty space formed by the trench to support the Hall plate, an edge element separated from the support plate to surround the support plate, and at least one connection element connecting the support plate to the edge element.

The first bias electrode, the second bias electrode, the at least one first detection electrode, and the at least one second detection electrode may be formed to extend in respective directions away from the Hall plate, and the at least one connection element may include a first connection element, a second connection element, a third connection element, and a fourth connection element respectively supporting the first bias electrode, the second bias electrode, the at least one first detection electrode, and the at least one second detection electrode.

The long-wave infrared detecting element may further include a reflection plate inside the trench.

The long-wave infrared detecting element may further include a reference conversion unit including a conductive reference plate, a protective layer covering the conductive reference plate, a third bias electrode provided at a first edge of the conductive reference plate, a fourth bias electrode provided at a second edge of the conductive reference plate opposite to the first edge of the conductive reference plate in the first direction, at least one third detection electrode provided at a third edge of the conductive reference plate, and at least one fourth detection electrode provided at a fourth edge of the conductive reference plate opposite to the third edge of the conductive reference plate in the second direction, wherein the magneto-electric conversion unit and the reference conversion unit constitute a differential amplifier circuit.

In accordance with an aspect of the disclosure, a long-wave infrared detecting element array structure includes a plurality of long-wave infrared detecting elements, each of the plurality of long-wave infrared detecting elements including a magnetic field generator configured to generate a magnetic field; a substrate on the magnetic field generator; a superparamagnetic material layer separated from the substrate and magnetized by the magnetic field generated by the magnetic field generator; a support unit on the substrate, the support unit supporting the superparamagnetic material layer such that the superparamagnetic material layer is separated from the substrate, such that the support unit and the superparamagnetic material layer generate heat by absorbing infrared radiation from the outside; and a magneto-electric conversion unit configured to generate an electrical signal proportional to both a strength of the magnetic field generated by the magnetic field generator and a magnetization of the superparamagnetic material layer, wherein the magnetization of the superparamagnetic material layer changes according to a temperature of the superparamagnetic material layer, and wherein the temperature of the superparamagnetic material layer changes according to an amount of the infrared radiation absorbed directly by the superparamagnetic material layer and according to an amount of the infrared radiation absorbed by the support unit.

The magnetic field generator and the substrate may be formed as one body.

In accordance with an aspect of the disclosure, a long-wave infrared temperature detecting device includes a long-wave infrared detecting element configured to absorb infrared radiation from an outside and detect a first electrical signal that changes according to the infrared radiation; a signal processor configured to process a second electrical signal transmitted from the long-wave infrared detecting element; and a display element configured to display an image generated by the second electrical signal processed by the signal processor, wherein the long-wave infrared detecting element includes a magnetic field generator configured to generate a magnetic field; a substrate on the magnetic field generator; a superparamagnetic material layer separated from the substrate and magnetized by the magnetic field generated by the magnetic field generator; a support unit on the substrate, the support unit supporting the superparamagnetic material layer such that the superparamagnetic material layer is separated from the substrate, such that the support unit and the superparamagnetic material layer generate heat by absorbing the infrared radiation from the outside; and a magneto-electric conversion unit configured to generate the second electrical signal proportional to both a strength of the magnetic field generated by the magnetic field generator and a magnetization of the superparamagnetic material layer, wherein the magnetization of the superparamagnetic material layer changes according to a temperature of the superparamagnetic material layer, and wherein the temperature of the superparamagnetic material layer changes according to an amount of the infrared radiation absorbed directly by the superparamagnetic material layer and according to an amount of the infrared radiation absorbed by the support unit.

The long-wave infrared temperature detecting device may further include an optical lens configured to focus incident infrared rays from the outside on the long-wave infrared detecting element; an aperture provided between the optical lens and the long-wave infrared detecting element to control an amount of the incident infrared rays reaching the long-wave infrared detecting element; and an optical filter between the optical lens and the long-wave infrared detecting element to selectively transmit the infrared radiation in a specific wavelength band that has passed through the optical lens.

In accordance with an aspect of the disclosure, a thermal imaging device includes an optical system configured to focus incident infrared rays from an outside; a long-wave infrared detecting element array structure including a plurality of long-wave infrared detecting elements configured to detect the incident infrared rays that have passed through the optical system; a controller configured to control the plurality of long-wave infrared detecting elements; a signal processor configured to process an electrical signal transmitted from the long-wave infrared detecting element array structure; and a display element configured to display an image generated by the electrical signal processed by the signal processor, wherein each of the plurality of long-wave infrared detecting elements includes a magnetic field generator configured to generate a magnetic field; a substrate on the magnetic field generator; a superparamagnetic material layer separated from the substrate and magnetized by the magnetic field generated by the magnetic field generator; a support unit on the substrate, the support unit supporting the superparamagnetic material layer such that the superparamagnetic material layer is separated from the substrate, such that the support unit and the superparamagnetic material layer generate heat by absorbing infrared radiation from the outside; and a magneto-electric conversion unit configured to generate the electrical signal proportional to both a strength of the magnetic field generated by the magnetic field generator and a magnetization of the superparamagnetic material layer, wherein the magnetization of the superparamagnetic material layer changes according to a temperature of the superparamagnetic material layer, and wherein the temperature of the superparamagnetic material layer changes according to an amount of the infrared radiation absorbed directly by the superparamagnetic material layer and according to an amount of the infrared radiation absorbed by the support unit.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
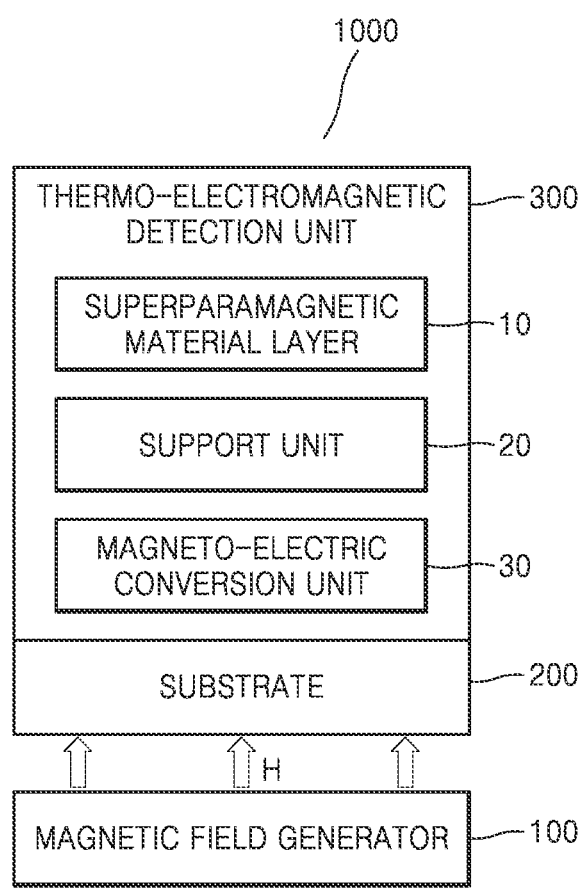
FIG. 1 is a block diagram schematically showing a configuration of a long-wave infrared detecting element according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the drawings, the size or thickness of each component in the drawings may be exaggerated for clarity of description.

It will be understood that when an element or layer is referred to as being "on" or "above" another element or layer, the element or layer may be directly on another element or layer or intervening elements or layers. The singular forms include the plural forms unless the context clearly indicates otherwise. It should be understood that, when a part "comprises" or "includes" an element in the specification, unless otherwise defined, it is not excluding other elements but may further include other elements.

In the specification, the term "above" and similar directional terms may be applied to both singular and plural. The use of all examples or illustrative terms is merely for describing technical concepts in detail, and the scope of the disclosure is not limited by the examples or illustrative terms unless limited by the claims.

It will be understood that, although the terms 'first', 'second', etc. may be used herein to describe various elements, these elements should not be limited by these terms. These terms are only used to distinguish one element from another.

The operations of all methods described herein may be performed in any suitable order unless otherwise indicated herein or otherwise clearly contradicted by context.

FIG. 1 is a block diagram schematically showing a configuration of a long-wave infrared detecting element 1000 according to an embodiment.

Referring to FIG. 1, the long-wave infrared detecting element 1000 may include a magnetic field generator 100 configured to generate a magnetic field, a substrate 200 on the magnetic field generator 100, and a thermo-electromagnetic detection unit 300 that is provided on the substrate 200 to absorb the incident infrared radiation and generate an electrical signal that changes according to a temperature that changes due to the amount of infrared radiation absorption.

The thermo-electromagnetic detection unit 300 is separated from the substrate 200 and may include a superparamagnetic material layer 10 that is magnetized by the magnetic field H generated by the magnetic field generator 100, a support unit 20 provided on the substrate 200 to support the superparamagnetic material layer 10 such that the superparamagnetic material layer 10 is separated from the substrate 200, such that the support unit and the superparamagnetic layer generate heat by absorbing infrared radiation from the outside, and a magneto-electric conversion unit 30 that generates an electrical signal according to the strength of a magnetic field H from the magnetic field generator 100 and the magnetization of the superparamagnetic material layer 10.

The magnetic field generator 100 may generate a magnetic field H of uniform intensity in a vertical direction. The substrate 200 and the thermo-electromagnetic detection unit 300 may be sequentially provided on the magnetic field generator 100 in a direction parallel to the direction of the magnetic field H. The magnetic field generator 100 may include, for example, an electromagnet, a permanent magnet, or the like. However, the disclosure is not limited thereto, and the magnetic field generator 100 may include various configurations that generate magnetic fields other than an electromagnet and a permanent magnet.

As shown in FIG. 1, the magnetic field generator 100 may be formed to be separated from the substrate 200. However, the disclosure is not limited thereto, and the magnetic field generator 100 may be provided to contact a lower surface of the substrate 200.

The substrate 200 may be a base layer for forming the thermo-electromagnetic detection unit 300. The substrate 200 may include, for example, a silicon (Si) substrate. However, the disclosure is not limited thereto, and the substrate 200 may include various materials.

The thermo-electromagnetic detection unit 300 may be configured to generate an electrical signal that changes according to a temperature that changes due to the amount of the incident infrared radiation absorbed from the outside. For example, the thermo-electromagnetic detection unit 300 may include the superparamagnetic material layer 10 that is magnetized by a magnetic field H generated by the magnetic field generator 100. The magnetization of the superparamagnetic material layer 10 may increase as the strength of the magnetic field H increases. In addition, the magnetization of the superparamagnetic material layer 10 may change according to a temperature of the superparamagnetic material layer 10. For example, the magnetization of the superparamagnetic material layer 10 may change according to a temperature of the superparamagnetic material layer 10 that changes due to the amount of the infrared radiation absorbed directly by the superparamagnetic material layer 10 and infrared radiation absorbed by the support unit 20. For example, the magnetization of the superparamagnetic material layer 10 may decrease as the temperature of the superparamagnetic material layer 10 increases.

In addition, the thermo-electromagnetic detection unit 300 may include a magneto-electric conversion unit 30 configured to detect an electrical signal proportional to the magnetic field strength H of the magnetic field generator 100 and the magnetization of the superparamagnetic material layer 10. For example, when the strength of a magnetic field H from the magnetic field generator 100 is constant, the magnetization of the superparamagnetic material layer 10 may change only according to temperature. In this case, when the magnetization of the superparamagnetic material layer 10 changes according to temperature, the electrical signal generated by the magneto-electric conversion unit 30 may also change according to temperature.

For example, the magneto-electric conversion unit 30 may include a Hall sensor configured to detect an electrical signal by using the Hall effect. The Hall sensor may be a device configured to generate a voltage difference (a Hall voltage) across an electrical conductor (a Hall plate 31a of FIG. 2) in a direction perpendicular to both an electrical current in the conductor and an applied magnetic field perpendicular to the current. The configuration and function of the Hall sensor will be described later with reference to FIGS. 2 and 6. However, the disclosure is not limited thereto, and the magneto-electric conversion unit 30 may include, for example, a magnetoresistive sensing element using a tendency of a material (often ferromagnetic) that changes a value of an electrical resistance according to an applied magnetic field.

Further, the thermo-electromagnetic detection unit 300 may include the support unit 20 that supports the superparamagnetic material layer such that the superparamagnetic material layer 10 is separated from the substrate 200. The support unit 20 may be configured to absorb infrared radiation from the outside. The support unit 20 may transmit heat generated by absorbing infrared radiation to the superparamagnetic material layer 10. Because the superparamagnetic material layer 10 is separated from the substrate 200 by the support unit 20, the heat generated in the support unit 20 may be efficiently transferred to the superparamagnetic material layer 10. Accordingly, the temperature and the magnetization of the superparamagnetic material layer 10 may change in real time. An electrical signal generated by the magneto-electric conversion unit 30 may change according to the magnetization of the superparamagnetic material layer 10.

Figure 2:
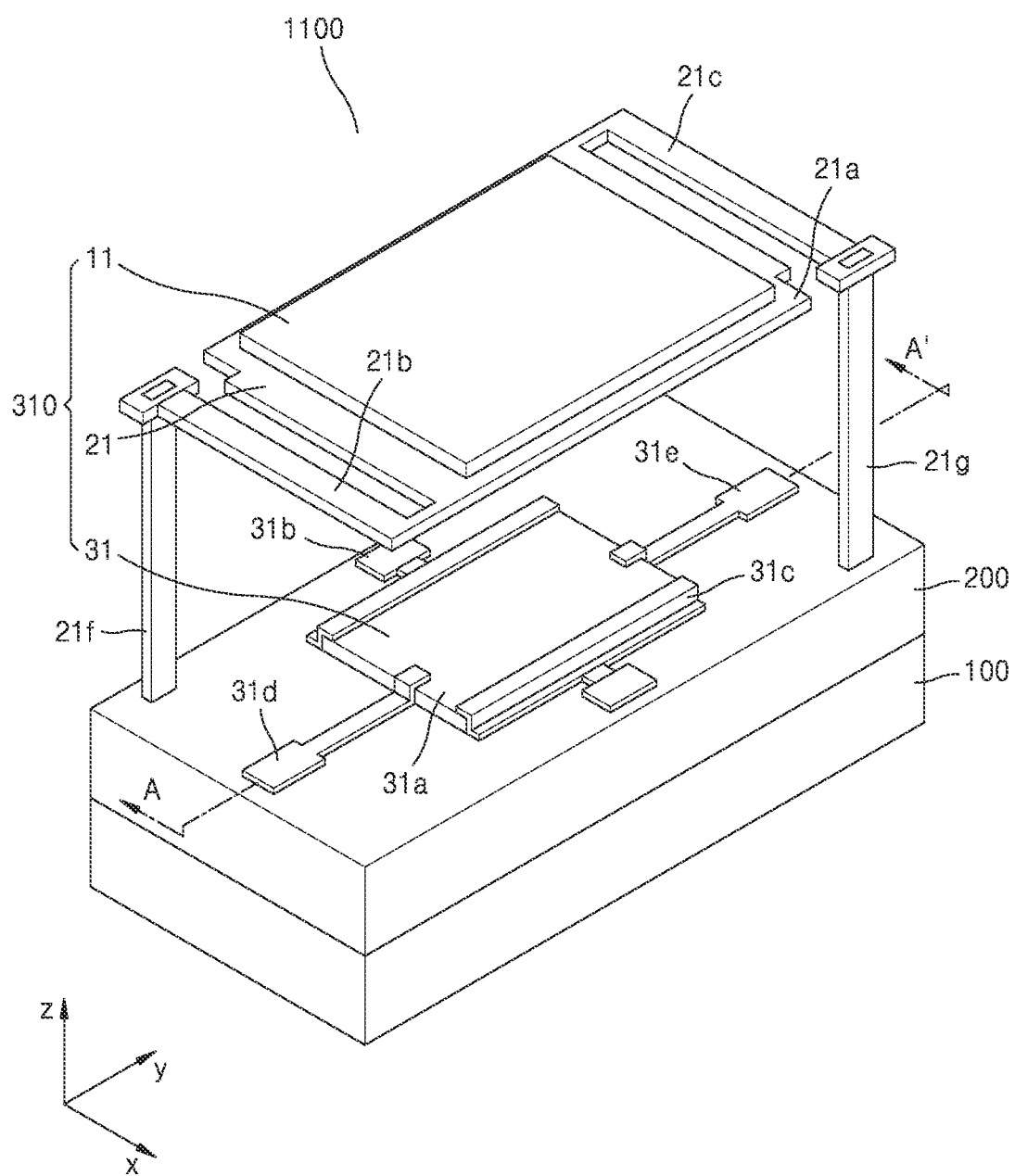
FIG. 2 is a schematic perspective view of a configuration of a long-wave infrared detecting element according to an embodiment.
Figure 3:
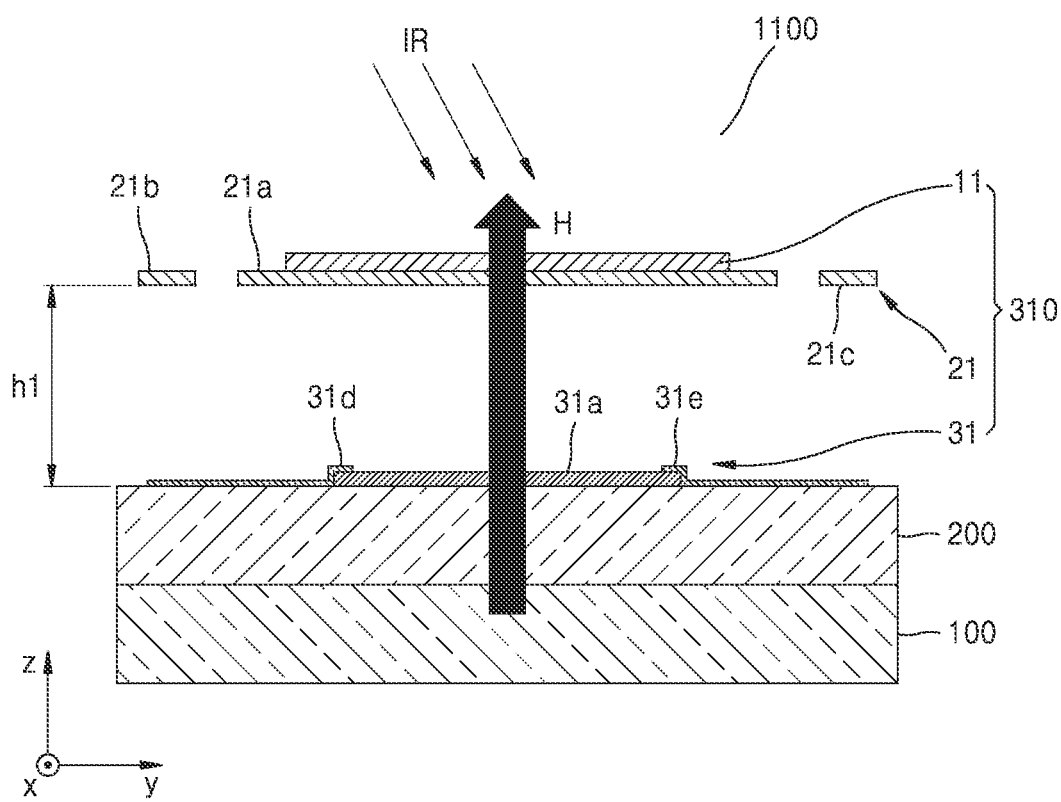
FIG. 3 is a simplified cross-sectional view taken along line A-A' of FIG. 2.
Figure 4:
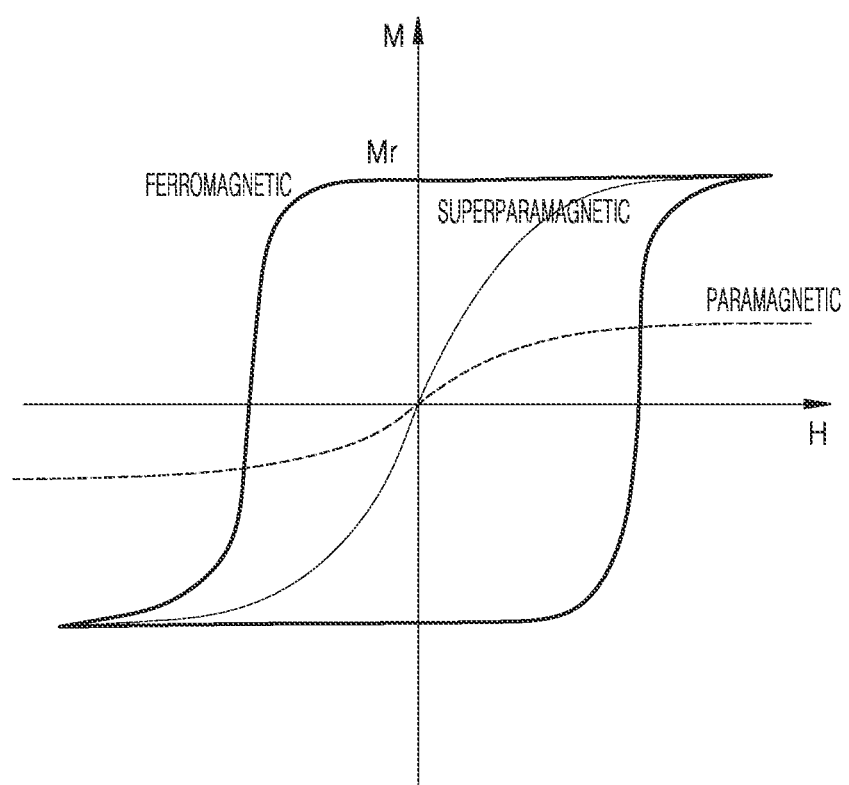
FIG. 4 is a graph for explaining the trend of a change in the magnetization M of a superparamagnetic material according to the applied magnetic field strength H.
Figure 5:
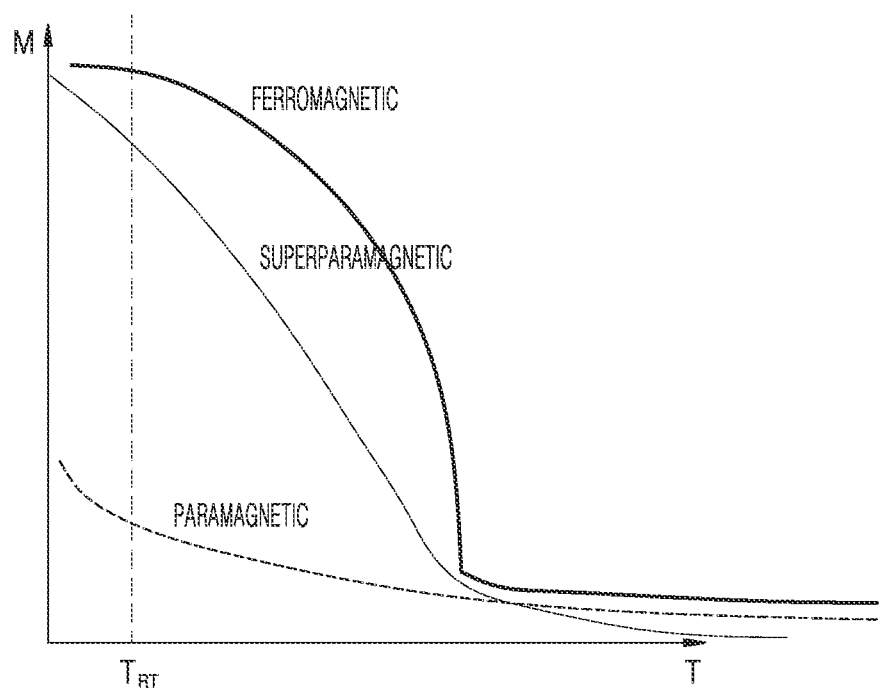
FIG. 5 is a graph for explaining the trend of a change in the magnetization M of a superparamagnetic material according to temperature.
Figure 6:
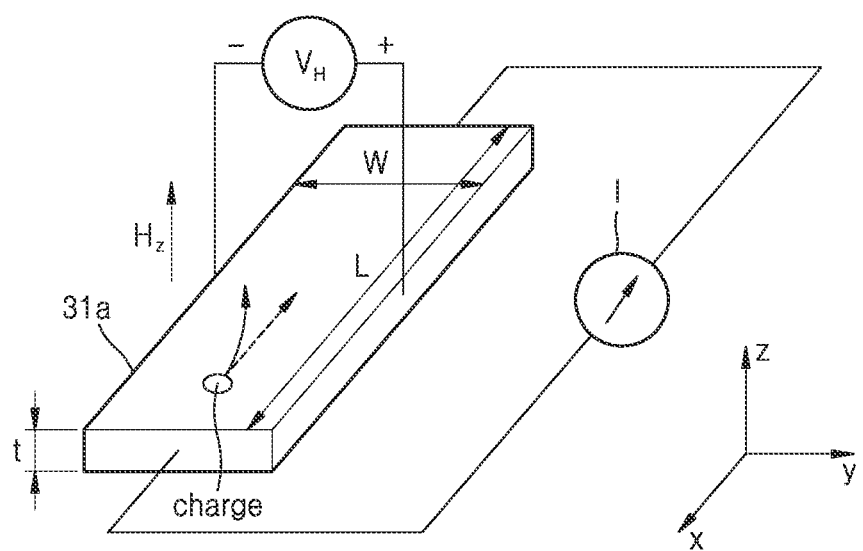
FIG. 6 is a schematic perspective view for explaining the Hall effect.
Figure 7:
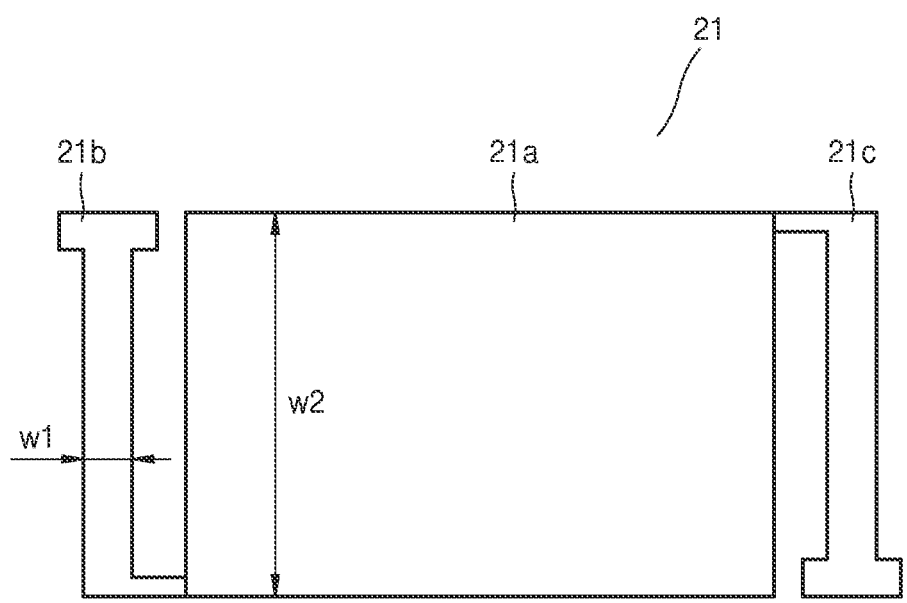
FIG. 7 is a schematic plan view illustrating a configuration of a support unit included in the long-wave infrared detecting element of FIG. 2.

FIG. 2 is a schematic perspective view showing a configuration of a long-wave infrared detecting element 1100 according to an embodiment. FIG. 3 is a simplified cross-sectional view taken along line A-A' of FIG. 2. FIG. 4 is a graph for explaining the trend of a change in the magnetization (M) of a superparamagnetic material according to the applied magnetic field strength (H). FIG. 5 is a graph for explaining the trend of a change in the magnetization (M) of a superparamagnetic material to change according to temperature (T). FIG. 6 is a schematic perspective view for explaining the Hall effect. FIG. 7 is a schematic plan view illustrating a configuration of a support unit 21 included in the long-wave infrared detecting element 1100 of FIG. 2.

Referring to FIGS. 2 and 3, the long-wave infrared detecting element 1100 may include a magnetic field generator 100 configured to generate a magnetic field, a substrate 200 on the magnetic field generator 100, and a thermo-electromagnetic detection unit 310 that is provided on the substrate 200 to absorb the incident infrared radiation and generates an electrical signal that changes according to a temperature that changes due to the amount of infrared radiation. The magnetic field generator 100 and the substrate 200 are as described with reference to FIG. 1. For example, the magnetic field generator 100 may generate a magnetic field H having a uniform intensity in a vertical direction (z-axis direction). The magnetic field H may pass through the substrate 200 and affect the thermo-electromagnetic detection unit 310. Hereinafter, the thermo-electromagnetic detection unit 310 will be described.

The thermo-electromagnetic detection unit 310 may include a superparamagnetic material layer 11 that is disposed to be separated from the substrate 200 and is magnetized by a magnetic field H generated by the magnetic field generator 100, a support unit 21 provided on the substrate 200 to support the superparamagnetic material layer such that the superparamagnetic material layer 11 is separated from the substrate 200, and to absorb infrared radiation from the outside, and a magneto-electric conversion unit 31 configured to generate an electrical signal according to the strength of the magnetic field H generated by the magnetic field generator 100 and the magnetization of the superparamagnetic material layer 11.

The superparamagnetic material layer 11 may include ferromagnetic nanoparticles. When the particle size of a ferromagnetic material is reduced to a nanoscale, the ferromagnetic material no longer exhibits ferromagnetic properties and becomes superparamagnetic. Depending on the type of material, the diameter of nanoparticles included in the superparamagnetic material layer 11 may be, for example, in a range about 3 nm to about 50 nm. For example, the superparamagnetic material layer 11 may include any one of $CoFe_2O_4$, $Fe_2O_3$, $Fe_3O_4$, FeCo, CoPt, Ni, Co, and Fe. In the case of $CoFe_2O_4$, superparamagnetic properties may be obtained when the particle diameter is about 10 nm. In addition, in the case of $Fe_2O_3$, superparamagnetic properties may be obtained when the particle diameter is about 30 nm. As such, the diameter of the particles included in the superparamagnetic material layer 11 may vary depending on the type of material. However, the disclosure is not limited thereto, and the superparamagnetic material layer 11 may include nanoparticles having various kinds of superparamagnetic properties other than the above-described materials.

Referring to FIG. 4, the magnetization M of the ferromagnetic material increases as the strength of the external magnetic field H increases. Also, the ferromagnetic material may have a non-zero remanent magnetization $M_r$ even when the external magnetic field H disappears. The magnetization M of a paramagnetic material increases as the intensity of the external magnetic field H increases. However, the magnetization M of the paramagnetic material is less than the magnetization M of the ferromagnetic material. Also, when an external magnetic field H disappears, the magnetization M of the paramagnetic material disappears. The magnetization M of a superparamagnetic material increases as the intensity of the external magnetic field H increases. Also, the magnetization M of a superparamagnetic material may be increased to a level similar to the magnetization M of a ferromagnetic material. Furthermore, in the superparamagnetic material, when the external magnetic field H disappears, the magnetization M of the superparamagnetic material disappears. In other words, a superparamagnetic material may have a magnetization M similar to the magnetization M of a ferromagnetic material. At the same time, similar to the case of a paramagnetic material, when the external magnetic field H disappears, the magnetization M of the superparamagnetic material disappears.

Referring to FIG. 5, the magnetization M of the ferromagnetic material and the paramagnetic material may not change linearly with temperature. In contrast, the magnetization M of a superparamagnetic material may change linearly with temperature. For example, the magnetization M of a superparamagnetic material may linearly decrease as the temperature increases. In fact, the magnetization M of a superparamagnetic material may not change completely linearly with temperature. However, a change in the magnetization M of a superparamagnetic material may be substantially closer to a substantially linear shape compared to a change in the magnetization M of a ferromagnetic material or a paramagnetic material.

Referring to FIGS. 2 and 3, the superparamagnetic material layer 11 may be magnetized by the magnetic field H generated by the magnetic field generator 100. Also, the magnetization of the superparamagnetic material layer 11 may change according to a temperature of the superparamagnetic material layer 11. For example, the magnetization of the superparamagnetic material layer 11 may change by a temperature of the superparamagnetic material layer 11 that changes due to infrared radiation absorbed directly by the superparamagnetic material layer 11 and the infrared radiation absorbed by the support unit 21. In this case, the magnetization M of the superparamagnetic material layer 11 may linearly change according to a temperature of the superparamagnetic material layer 11. For example, as the temperature of the superparamagnetic material layer 11 increases due to infrared radiation, the magnetization M of the superparamagnetic material layer 11 may linearly decrease.

The magneto-electric conversion unit 31 may be configured to generate an electrical signal according to the strength of the magnetic field H generated by the magnetic field generator 100 and the magnetization M of the superparamagnetic material layer 11. The magneto-electric conversion unit 31 may be provided on the substrate 200. For example, the magneto-electric conversion unit 31 may be provided to contact an upper surface of the substrate 200.

The magneto-electric conversion unit 31 may include a Hall plate 31a, a pair of bias electrodes 31b and 31c (i.e., a first bias electrode and a second bias electrode) provided at both ends of the Hall plate 31a (i.e., at a first edge and a second edge opposite to the first edge) in a first direction (x-axis direction), and at least one pair of detection electrodes 31d and 31e (i.e., at least one first detection electrode and at least one second detection electrode) provided at both ends of the Hall plate 31a (i.e., at a third edge and a fourth edge opposite to the third edge) in a second direction (y-axis direction) perpendicular to the first direction (x-axis direction). In this case, both the first direction (x-axis direction)

and the second direction (y-axis direction) may be directions perpendicular to a direction of the magnetic field H (z-axis direction) generated by the magnetic field generator 100.

The Hall plate 31*a* may include a conductive material, such as a semiconductor material or a metal. For example, the Hall plate 31*a* may include an extrinsic semiconductor material implanted with impurities. The Hall plate 31*a* may be fabricated and driven so that a Hall voltage $V_H$ (to be described later with reference to FIG. 6) generated across the Hall plate 31*a* does not change according to the temperature of the Hall plate 31*a*. In other words, when all other physical conditions are the same, the Hall voltage $V_H$ generated across the Hall plate 31*a* may be kept constant even if the temperature of the Hall plate 31*a* changes. In this case, the Hall voltage $V_H$ of the Hall plate 31*a* may change only as the magnetization M of the superparamagnetic material layer 11 changes.

An upper surface of the Hall plate 31*a* may be rectangular. For example, the Hall plate 31*a* may include a rectangular parallelepiped shape. However, the disclosure is not limited thereto, and the Hall plate 31*a* may have various shapes. In addition, the length of the Hall plate 31*a* in the first direction (x-axis direction) may be greater than three times the length thereof in the second direction (y-axis direction). However, the disclosure is not limited thereto, and a ratio of the length in the first direction (x-axis direction) and the length in the second direction (y-axis direction) of the Hall plate 31*a* may be variously changed.

On the other hand, when the Hall plate 31*a* has a rectangular parallelepiped shape, the pair of bias electrodes 31*b* and 31*c* may be formed to cover two edges facing each other in the first direction (x-axis direction) of the Hall plate 31*a*. The pair of bias electrodes 31*b* and 31*c* may be provided on a straight line parallel to the first direction (x-axis direction). For example, the pair of bias electrodes 31*b* and 31*c* may be formed to extend in the second direction (y-axis direction), and may cover two edges facing each other in the first direction (x-axis direction) of the Hall plate 31*a*. In addition, the pair of bias electrodes 31*b* and 31*c* may be formed in a stepwise manner to cover the two edges facing each other in the first direction (x-axis direction) of the Hall plate 31*a*, and at the same time, may contact a portion of the upper surface of the substrate 200.

In this case, the pair of detection electrodes 31*d* and 31*e* may be formed to contact a portion of each of the two edges facing each other in the second direction (y-axis direction) of the Hall plate 31*a*. The pair of detection electrodes 31*d* and 31*e* may be provided on a straight line parallel to the second direction (y-axis direction). Further, the pair of detection electrodes 31*d* and 31*e* may be formed to extend in a direction away from the Hall plate 31*a* while in contact with the Hall plate 31*a*. The pair of detection electrodes 31*d* and 31*e* may be formed in a stepwise manner, respectively may contact two edges facing each other in the second direction (y-axis direction) of the Hall plate 31*a*, and at the same time, contact a portion of the upper surface of the substrate 200.

A current or voltage of a certain intensity may be applied between the pair of bias electrodes 31*b* and 31*c*. Accordingly, a current may flow through the Hall plate 31*a* in the first direction (the x-axis direction). When the magnetic field H generated by the magnetic field generator 100 is applied to the Hall plate 31*a* in the vertical direction (z-axis direction), the distribution of charge density across the Hall plate 31*a* in the second direction (y-axis direction) becomes asymmetric. This phenomenon is referred to as the Hall effect. With reference to FIG. 6, the Hall effect will be described in more detail. In FIG. 6, for convenience of description, the pair of bias electrodes 31*b* and 31*c* and the pair of detection electrodes 31*d* and 31*e* are omitted.

The Hall plate 31*a* having a thickness t may be configured so that a current of a constant intensity flows therethrough in the first direction (x-axis direction). For example, when a constant current I is applied to the Hall plate 31*a* in the first direction (x-axis direction), a negative (−) charge may move in the Hall plate 31*a* in the first direction (x-axis direction). In this case, when a magnetic field $H_z$ is applied to the Hall plate 31*a* in the vertical direction (z-axis direction), the negative (−) charge may receive a Lorentz force, and thus, may move in the second direction (y-axis direction) which is perpendicular to both the first direction (x-axis direction) and the vertical direction (z-axis direction). In this case, the magnetic field $H_z$ in the vertical direction (z-axis direction) may be applied to the Hall plate 31*a* by the magnetic field generator 100. Accordingly, the distribution of charge density in the second direction (y-axis direction) of the Hall plate 31*a* becomes asymmetric, and a voltage difference occurs across the Hall plate 31*a* in the second direction (y-axis direction). In this case, the voltage difference across the Hall plate 31*a* in the second direction (y-axis direction) is referred to as the Hall voltage $V_H$. The Hall voltage $V_H$ across the Hall plate 31*a* in the second direction (y-axis direction) may be measured by the pair of detection electrodes 31*d* and 31*e* provided to face each other at both ends of the Hall plate 31*a* in the second direction (y-axis direction). For example, the Hall voltage $V_H$ across the Hall plate 31*a* in the second direction (y-axis direction) may be measured through a voltage measuring device connected to the pair of detection electrodes 31*d* and 31*e*. In this case, the Hall voltage $V_H$ may be determined according to a ratio L/W of a first length L in the first direction (x-axis direction) of the Hall plate 31*a* with respect to a second length W in the second direction (y-axis direction) of the Hall plate 31*a*. For example, the ratio L/W may be greater than 3. However, the disclosure is not limited thereto, and the ratio L/W may be less than 3.

Meanwhile, as described with reference to FIGS. 2 and 3, the magnetization of the superparamagnetic material layer 11 may linearly decrease as the temperature of the superparamagnetic material layer 11 increases. The variable magnetization of the superparamagnetic material layer 11 according to a change in the temperature of the superparamagnetic material layer 11 may affect the Hall plate 31*a* in a perpendicular direction (z-axis direction). Accordingly, the variable magnetization of the superparamagnetic material layer 11 according to a change in temperature of the superparamagnetic material layer 11 may change a Hall voltage generated in the second direction (y-axis direction) of the Hall plate 31*a*.

In this way, the magnetization change of the superparamagnetic material layer 11 may change the Hall voltage $V_H$ of the Hall plate 31*a* included in the magneto-electric conversion unit 31. Such a change in the Hall voltage of the Hall plate 31*a* may be measured through the pair of detection electrodes 31*d* and 31*e*. As a result, the amount of temperature change in the superparamagnetic material layer 11 may be inferred from the amount of change in the Hall voltage $V_H$ measured by using the magneto-electric conversion unit 31.

The support unit 21 may include a support plate 21*a* for supporting the superparamagnetic material layer 11, support columns 21*f* and 21*g* formed by protruding from the upper surface of the substrate 200 in a vertical direction (z-axis direction), and connection units 21b and 21c connecting the support plate 21a to upper portions of the support columns 21f and 21g.

The height of the support columns 21f and 21g may correspond to ¼ of the center wavelength of infrared radiation incident on the support unit 21. For example, when the center wavelength of the infrared rays IR incident on the support unit 20 is 10 μm, the heights of the support columns 21f and 21g may be 2.5 μm. Accordingly, a separation distance h1 between the support unit 20 and the substrate 200 may correspond to ¼ of the center wavelength of the infrared rays IR incident on the support unit 20. In this case, an optical resonance may occur between the support unit 21 and the substrate 200, and the absorption of infrared radiation by the support unit 21 may be enhanced.

The support plate 21a and the support columns 21f and 21g may be provided to be separated from each other on a plane perpendicular to the vertical direction (z-axis direction). For example, the support columns 21f and 21g may include a first support column 21f and a second support column 21g respectively provided in two edge regions facing each other in a diagonal direction on the upper surface of the substrate 200. In addition, for example, the connection units 21b and 21c may include a first connection unit 21b connecting an upper part of the first support column 21f to the support plate 21a and a second connection unit 21c connecting an upper part of the second support column 21g to the support plate 21a. In this case, the support plate 21a may be provided on a central region of the substrate 200 and may be separated from the substrate 200 by the height of the support columns 21f and 21g. However, the disclosure is not limited thereto, and the number of support columns and the number of connection units are both not limited to two. For example, the number of support columns and the number of connection units may be one or more. Hereinafter, a case when the number of support columns and the number of connection units are both two will be described with reference to FIG. 7. The description of FIG. 7 may be applied even when the number of support columns and the number of connection units may be one or more.

Referring to FIG. 7, the support unit 21 may include the support plate 21a having an upper surface of a rectangular shape. For example, the support plate 21a may have a rectangular parallelepiped shape. However, the disclosure is not limited thereto, and the support plate 21a may include various shapes other than a rectangular parallelepiped shape. In addition, the support unit 21 may include the first connection unit 21b and the second connection unit 21c respectively connected to both edges of the support plate 21a having a rectangular parallelepiped shape. The first and second connection units 21b and 21c may include an 'L' character pattern. Alternatively, the first and second connection units 21b and 21c may include meander patterns. In this way, the first and second connection units 21b and 21c may include a serpentine pattern, such as an 'L' character pattern or meander pattern. However, the disclosure is not limited thereto, and the first and second connection units 21b and 21c may include a rod pattern extending in one direction. The first and second connection units 21b and 21c may have a first width w1 that is less than a second width w2 of the support plate 21a. In addition, areas of the first and second connection units 21b and 21c may be less than the area of the support plate 21a. Heat generated by infrared absorption may be efficiently transferred to the superparamagnetic material layer 11 through a thermal isolation structure of the support unit 21, and as a result, an efficient conversion of infrared radiation into electrical energy may be achieved.

The support unit 21 may include at least one of silicon oxide and silicon nitride. Silicon oxide may include, for example, $SiO_2$. Silicon nitride may include, for example, $Si_3N_4$. However, the disclosure is not limited thereto, and the support unit 21 has a rigidity sufficient to support the superparamagnetic material layer 11 and may include various materials capable of efficiently absorbing infrared radiation.

In addition, all of the support plate 21a, the connection units 21b and 21c, and the support columns 21f and 21g may include at least one of silicon oxide and silicon nitride. In this case, the support plate 21a, the connection units 21b and 21c, and the support columns 21f and 21g may be formed as one body. However, the disclosure is not limited thereto, and the support plate 21a and the connection units 21b and 21c may be formed as one body, and the support columns 21f and 21g may be formed in a separate process.

As described above, when the support unit 21 is configured to separate the superparamagnetic material layer 11 from the substrate 200 by a predetermined height, compared to a case when the substrate 200 and the superparamagnetic material layer 11 are in direct contact, the generated heat may be more efficiently transferred to the superparamagnetic material layer 11.

Figure 8:
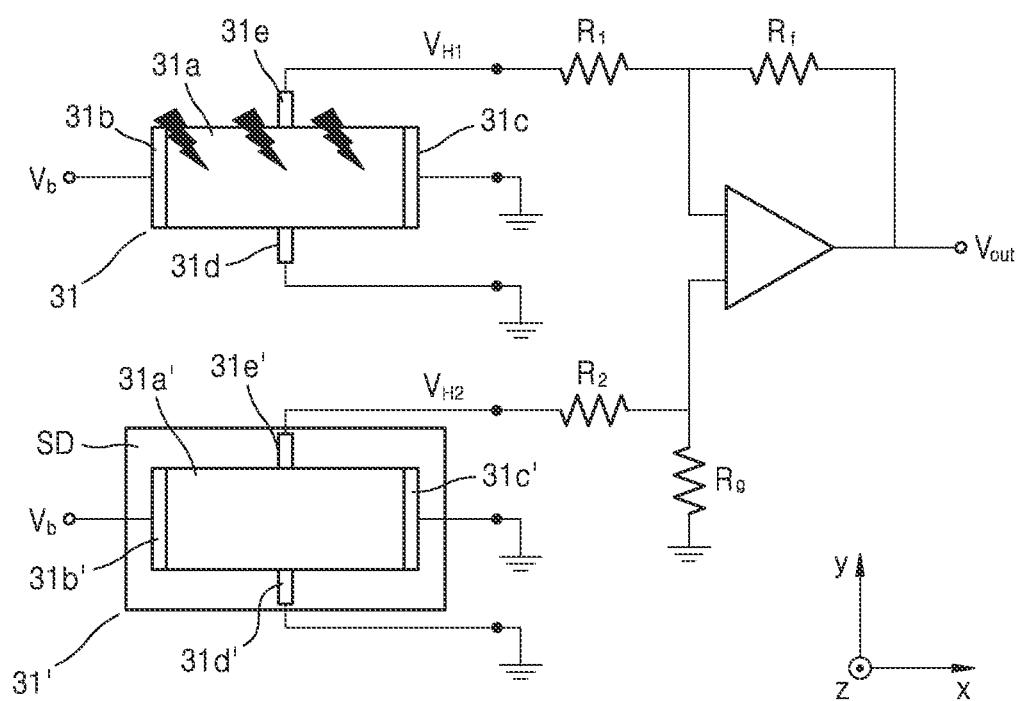
FIG. 8 is a diagram schematically illustrating a configuration of a reference conversion unit used to remove an offset that may be included in the long-wave infrared detecting element of FIG. 2.

FIG. 8 is a diagram schematically illustrating a configuration of a reference conversion unit 31' used to remove an offset that may be included in the long-wave infrared detecting element 1100 of FIG. 2.

As described with reference to FIGS. 2 and 6, a magneto-electric conversion unit 31 may include a Hall sensor. Ideally, a Hall voltage of the Hall sensor should be 0 in the absence of an external magnetic field, but in practice an offset may occur depending on process issues, various factors (e.g., nonuniform electrical characteristics inside the Hall sensor, or an electrode structure asymmetrically provided in the Hall sensor), etc. In order to minimize the offset, the long-wave infrared detecting element 1100 of FIG. 2 may further include a reference conversion unit 31' connected to the magneto-electric conversion unit 31.

The reference conversion unit 31' may include basically the same constituent elements as the magneto-electric conversion unit 31. For example, the reference conversion unit 31' may include a conductive reference plate 31a', a pair of bias electrodes 31b' and 31c' provided at both edges of the conductive reference plate 31a' in the first direction (x-axis direction), and at least one pair of detection electrodes 31d' and 31e' provided at both edges of the reference plate 31a' in a second direction (y-axis direction) perpendicular to the first direction (x-axis direction). Furthermore, the reference conversion unit 31' may further include a protective layer SD covering the conductive reference plate 31a'. Both the first direction (x-axis direction) and the second direction (y-axis direction) may be perpendicular to a direction (z-axis direction) of the magnetic field H (refer to FIG. 2) generated by the magnetic field generator 100 (refer to FIG. 2). A differential amplifier circuit is provided to amplify the difference in voltage of the magneto-electric conversion unit 31 and the reference conversion unit 31'. The reference conversion unit 31' may be manufactured together with the magneto-electric conversion unit 31 in the same process as the magneto-electric conversion unit 31 and may have the same offset. However, the reference conversion unit 31' may include the protective layer SD capable of blocking an incident infrared radiation from the outside, and the incident infrared radiation does not cause a change in the output signal of the reference converter 31'. The protective layer SD may be configured to cover not only the reference plate 31a', but also the pair of bias electrodes 31b' and 31c' and the pair of detection electrodes 31d' and 31e'. When a first Hall voltage $V_{H1}$ of the magneto-electric conversion unit 31 and a second Hall voltage $V_{H2}$ of the reference conversion unit 31' are detected through differential amplification, it may compensate for offsets caused by various factors, such as process problems. For example, a differential amplification voltage Vout may be as shown in Equation 1 below.

$$V_{out} = V_{H2}\frac{(R_f + R_1)R_g}{(R_g + R_2)R_1} - V_{H1}\frac{R_f}{R_1} \quad \text{Equation 1}$$

In the above Equation 1, $R_1$ and $R_f$ are values of resistors connected to the magneto-electric conversion unit 31, and $R_2$ and Rg are values of resistances connected to the reference conversion unit 31'.

Figure 9:
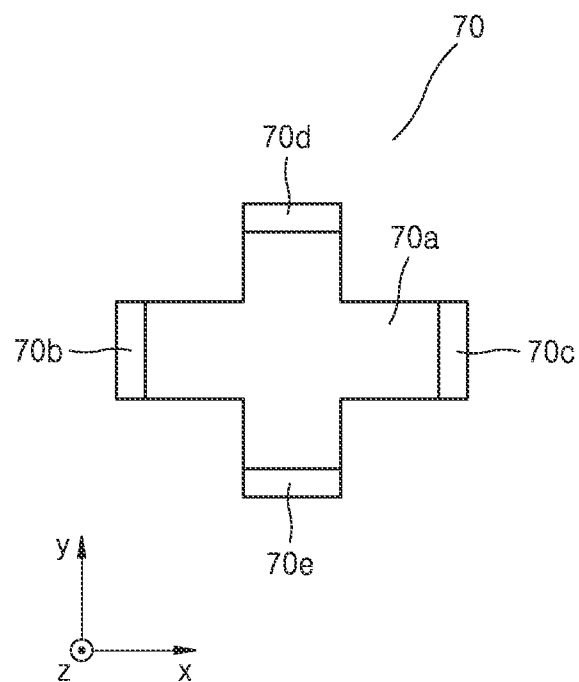
FIG. 9 is a schematic plan view of a configuration of a magneto-electric conversion unit according to an embodiment.
Figure 10:
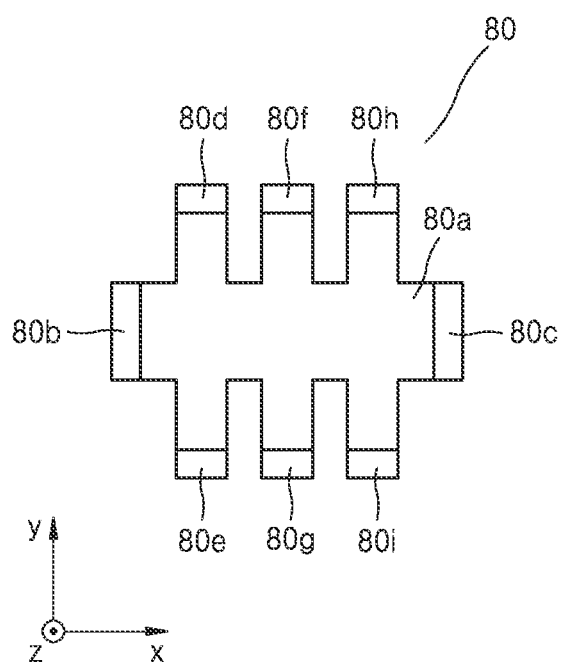
FIG. 10 is a schematic plan view illustrating a configuration of a magneto-electric conversion unit according to an embodiment.
Figure 11:
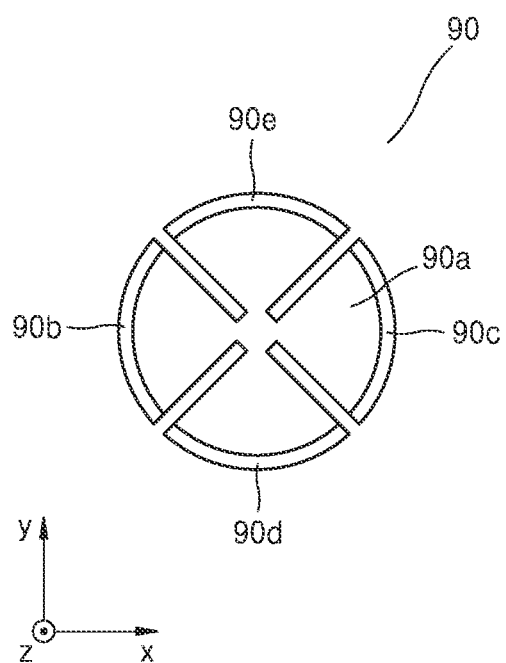
FIG. 11 is a schematic plan view of a configuration of a magneto-electric conversion unit according to an embodiment.

FIG. 9 is a schematic plan view showing a configuration of a magneto-electric conversion unit 70 according to an embodiment. FIG. 10 is a schematic plan view showing a configuration of a magneto-electric conversion unit 80 according to an embodiment. FIG. 11 is a schematic plan view showing a configuration of a magneto-electric conversion unit 90 according to an embodiment. The magneto-electric conversion units 70, 80, and 90 described with reference to FIGS. 9 to 11 may be applied to the long-wave infrared detecting element 1100 of FIG. 2.

Referring to FIG. 9, the magneto-electric conversion unit 70 may include a Hall plate 70a having a cross-shaped upper surface, a pair of bias electrodes 70b and 70c provided at both edges of the Hall plate 70a in the first direction (x-axis direction), and at least one pair of detection electrodes 70d and 70e provided at both edges of the Hall plate 70a in a second direction (y-axis direction) perpendicular to the first direction (x-axis direction). The pair of bias electrodes 70b and 70c and the pair of detection electrodes 70d and 70e may be formed by extending from the Hall plate 70a like the pair of bias electrodes 31b and 31c and the pair of detection electrodes 31d and 31e in FIG. 2.

Referring to FIG. 10, the magneto-electric conversion unit 80 may include a Hall plate 80a having an upper surface of a shape formed by intersecting with a plurality of rectangles extending in the second direction (y-axis direction) to a rectangle formed extending in the first direction (x-axis direction), a pair of bias electrodes 80b and 80c provided at both edges of the Hall plate 80a in the first direction (x-axis direction), and a plurality of pairs of detection electrodes 80d, 80e, 80f, 80g, 80h, and 80i provided at both edges of the Hall plate 80a in the second direction (y-axis direction) perpendicular to the first direction (x-axis direction). The plurality of pairs of detection electrodes 80d, 80e, 80f, 80g, 80h, and 80i may be provided at both edges of each of the plurality of rectangular protrusions of the Hall plate 80a formed to extend in the second direction (y-axis direction). The pair of bias electrodes 80b and 80c and the plurality of pairs of detection electrodes 80d, 80e, 80f, 80g, 80h, and 80i may be formed to extend from the Hall plate 80a like the pair of bias electrodes 31b and 31c and the pair of detection electrodes 31d and 31e of FIG. 2.

Referring to FIG. 11, the magneto-electric conversion unit 90 may include a Hall plate 90a having a clover-shaped upper surface, a pair of bias electrodes 90b and 90c provided at both edges of the Hall plate 90a in the first direction (x-axis direction), and at least one pair of detection electrodes 90d and 90e provided at both edges of the Hall plate 90a in a second direction (y-axis direction) perpendicular to the first direction (x-axis direction). The pair of bias electrodes 90b and 90c and the pair of detection electrodes 90d and 90e may be formed by extending from the Hall plate 70a like the pair of bias electrodes 31b and 31c and the pair of detection electrodes 31d and 31e in FIG. 2.

As described above with reference to FIGS. 9 to 11, the magneto-electric conversion units 70, 80, and 90 may have various shapes. Also, in addition to the shapes shown in FIGS. 9 to 11, the magneto-electric conversion units 70, 80, and 90 may include various shapes.

Figure 12:
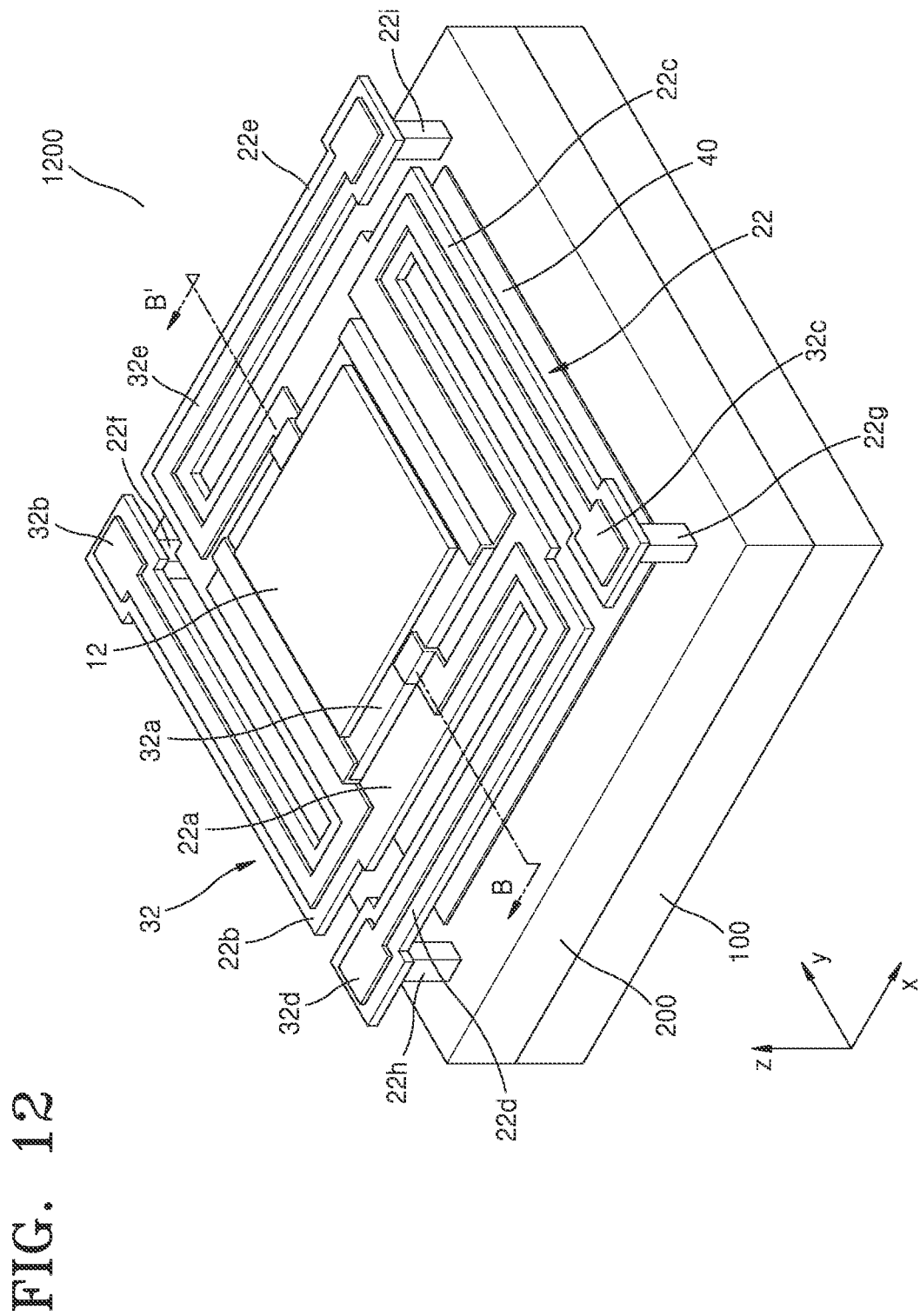
FIG. 12 is a schematic perspective views showing an example configuration of a long-wave infrared detecting element according to an embodiment.
Figure 13:
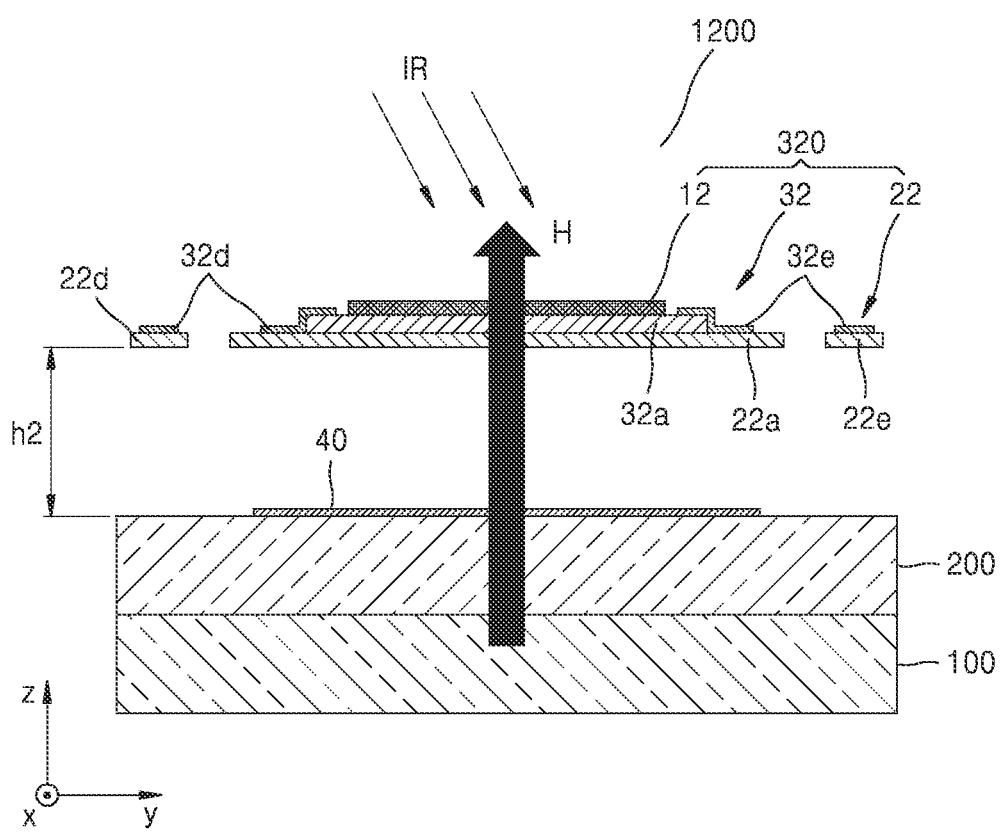
FIG. 13 is a simplified cross-sectional view taken along line B-B' of FIG. 12.
Figure 14:
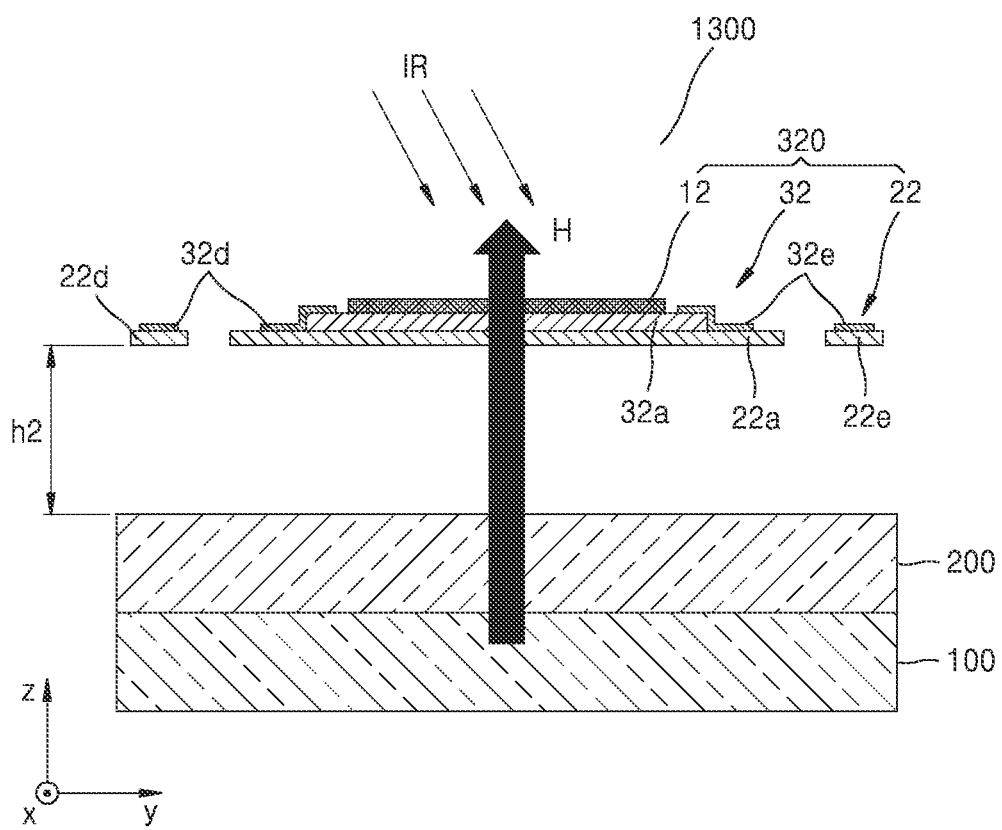
FIG. 14 is a schematic diagram of a configuration of a long-wave infrared detecting element according to an embodiment.
Figure 15:
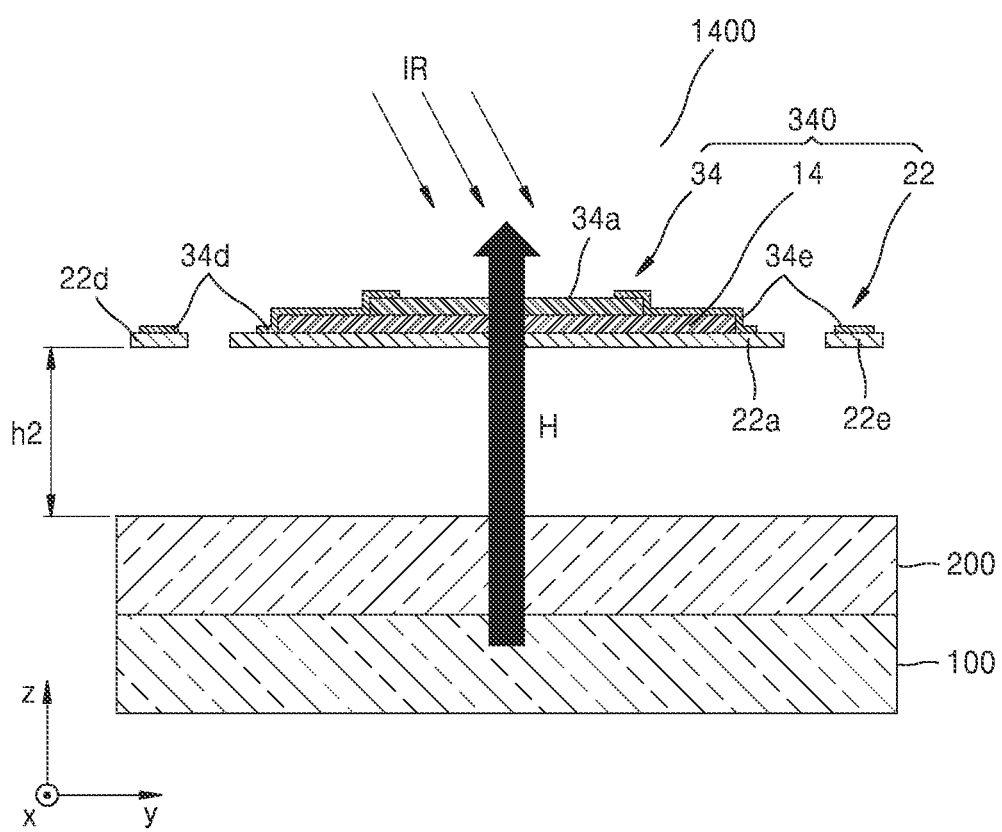
FIG. 15 is a schematic diagram of a configuration of a long-wave infrared detecting element according to an embodiment.

FIG. 12 is a schematic perspective view showing a configuration of a long-wave infrared detecting element 1200 according to an embodiment. FIG. 13 is a simplified cross-sectional view taken along line B-B' of FIG. 12. FIG. 14 is a schematic perspective view showing a configuration of a long-wave infrared detecting element 1300 according to an embodiment. FIG. 15 is a schematic perspective view showing a configuration of a long-wave infrared detecting element 1400 according to an embodiment.

The functions of the superparamagnetic material layer 12 and the magneto-electric conversion unit 32 shown in FIGS. 12 and 13 may be substantially the same as the function of the superparamagnetic material layer 11 and the magneto-electric conversion unit 31 shown in FIGS. 2 and 3. In describing the long-wave infrared detections 1200 and 1300 of FIGS. 12 and 13, descriptions previously given with reference to FIGS. 2 to 11 will be omitted.

Referring to FIGS. 12 and 13, the long-wave infrared detecting element 1200 may include a magnetic field generator 100 configured to generate a magnetic field, a substrate 200 on the magnetic field generator 100, and a thermo-electromagnetic detection unit 320 provided on the substrate 200 to absorb incident infrared radiation and to generate an electrical signal that changes according to a temperature that changes due to the amount of the infrared radiation absorption. The magnetic field generator 100 and the substrate 200 may be the same as the magnetic field generator 100 and the substrate 200 described with reference to FIG. 1. For example, the magnetic field generator 100 may generate a magnetic field H having a uniform intensity in a vertical direction (z-axis direction). The magnetic field H may pass through the substrate 200 and act on the thermo-electromagnetic detection unit 320. Hereinafter, the thermo-electromagnetic detection unit 320 will be described.

The thermo-electromagnetic detection unit 320 may include a superparamagnetic material layer 12 to be separated from the substrate 200 and magnetized by a magnetic field H generated by the magnetic field generator 100, a support unit 22 provided on the substrate 200 to support the superparamagnetic material layer 12 such that the superparamagnetic material layer 12 is separated from the substrate 200, and to generate heat by absorbing infrared radiation from the outside, and a magneto-electric conversion unit 32 configured to generate an electrical signal according to the strength of the magnetic field H generated by the magnetic field generator 100 and the of magnetization of the superparamagnetic material layer 12.

The magneto-electric conversion unit 32 may be configured to generate an electrical signal according to the strength of the magnetic field H generated by the magnetic field generator 100 and the magnetization of the superparamagnetic material layer 12. The magneto-electric conversion unit 32 may be provided to be separated from the substrate 200. For example, the magneto-electric conversion unit 32 may be provided on the support unit 22. In this case, as shown in FIGS. 12 and 13, the superparamagnetic material layer 12 may be provided on the magneto-electric conversion unit 32. Accordingly, the magneto-electric conversion unit 32 and the superparamagnetic material layer 12 may be sequentially stacked on the support unit 22. However, the disclosure is not limited thereto, and as shown in FIG. 15, a superparamagnetic material layer 14 may be provided between the support unit 22 and a magneto-electric conversion unit 34. In this case, a pair of detecting elements 34d and 34e provided at both edges of the Hall plate 34a in the second direction (y-axis direction) are formed in a stepwise manner, and may cover a part of the superparamagnetic material layer 14 and a part of the support plate 22a. Although not shown in FIG. 15, the magneto-electric conversion unit 34 may also include a pair of bias electrodes at both edges of the Hall plate 34a in the first direction (x-axis direction). In this case, the pair of bias electrodes included in the magneto-electric conversion unit 34 are also formed in a stepwise manner, and may cover a part of the superparamagnetic material layer 14 and a part of the support plate 22a.

The magneto-electric conversion unit 32 may include a Hall plate 32a, a pair of bias electrodes 32b and 32c provided at both edges of the Hall plate 32a in the first direction (x-axis direction), and at least one pair of detection electrodes 32d and 32e provided at both edges in the second direction (y-axis direction) perpendicular to the first direction (x-axis direction) of the Hall plate 32a. In this case, both the first direction (x-axis direction) and the second direction (y-axis direction) may be a direction perpendicular to a direction of the magnetic field H (z-axis direction) generated by the magnetic field generator 100.

When the Hall plate 32a has a rectangular parallelepiped shape, the pair of bias electrodes 32b and 32c will be formed to cover two edges facing each other in the first direction (x-axis direction) of the Hall plate 32a, respectively. For example, the pair of bias electrodes 32b and 32c are formed extending in the second direction (y-axis direction), and cover two edges facing each other in the first direction (x-axis direction) of the Hall plate 32a, respectively. The pair of bias electrodes 32b and 32c may be provided on a straight line parallel to the first direction (x-axis direction). In addition, the pair of bias electrodes 32b and 32c may be formed in a stepwise manner to cover two edges facing each other in the first direction (x-axis direction) of the Hall plate 32a, and may contact a portion of an upper surface of a support plate 22a which will be described later.

The pair of bias electrodes 32b and 32c may include a pattern extending from the Hall plate 32a. For example, the pair of bias electrodes 32b and 32c may include a meander pattern. Accordingly, the pair of bias electrodes 32b and 32c may cover two edges facing each other in the first direction (x-axis direction) of the Hall plate 32a, and at the same time, may include a meander pattern formed by extending from the Hall plate 32a. However, the disclosure is not limited thereto, and the pair of bias electrodes 32b and 32c may include a rod pattern extending in one direction.

In this case, the pair of detection electrodes 32d and 32e may be formed where portions of the pair of detection electrodes 32d and 32e respectively contact two edges facing each other in the second direction (y-axis direction) of the Hall plate 32a. The pair of detection electrodes 32d and 32e may be provided on a straight line parallel to the second direction (y-axis direction). Further, the pair of detection electrodes 32d and 32e may include a pattern extending from the Hall plate 32a while in contact with the Hall plate 32a. For example, the pair of bias electrodes 32d and 32e may include a meander pattern. However, the disclosure is not limited thereto, and the pair of bias electrodes 32d and 32e may include a rod pattern extending in one direction. The pair of detection electrodes 32d and 32e may be formed in a stepwise manner to contact each of two edges facing each other in the second direction (y-axis direction) of the Hall plate 32a, and at the same time, may contact a portion of an upper surface of a support plate 22a which will be described later.

The support unit 22 may include a support plate 22a supporting the superparamagnetic material layer 12 and the magneto-electric conversion part 32, support columns 22f, 22g, 22h, and 22i formed by protruding in a vertical direction (z-axis direction) from an upper surface of the substrate 200, and connection units 22b, 22c, 22d, and 22e connecting the support plate 22a and upper portions of the support columns 22f, 22g, 22h, and 22i.

The support columns 22f, 22g, 22h, and 22i may have a height correspond to ¼ of the center wavelength of the infrared rays IR incident on the support unit 22. For example, when the center wavelength of the infrared rays IR incident on the support unit 22 is 10 µm, the heights of the support columns 22f, 22g, 22h, and 22i may be 2.5 µm. Accordingly, a separation distance h2 between the support unit 22 and the substrate 200 may correspond to ¼ of the center wavelength of the infrared rays IR incident on the support unit 22. In this case, an optical resonance may occur between the support unit 22 and the substrate 200, and the absorption of infrared radiation by the support unit 22 may be enhanced.

The support plate 22a and the support columns 22f, 22g, 22h, and 22i may be provided to be separated from each other on a plane perpendicular to a vertical direction (z-axis direction). For example, the support columns 22f, 22g, 22h, and 22i may include first to fourth support columns 22f, 22g, 22h, and 22i respectively provided in four edge regions of the upper surface of the substrate 200. In addition, for example, the connection units 22b, 22c, 22d, and 22e may include a first connection unit 22b connecting an upper portion of the first support column 22f and the support plate 21a, a second connection unit 22c connecting an upper portion of the first support column 22g and the support plate 21a, a third connection unit 22d connecting an upper portion of the first support column 22h and the support plate 21a, and a fourth connection unit 22e connecting an upper portion of the first support column 22i and the support plate 21a.

The support unit 22 may include the support plate 22a having an upper surface of a rectangular shape. For example, the support plate 22a may have a rectangular parallelepiped shape. For example, the support plate 22a may have a thin plate shape. However, the disclosure is not limited thereto, and the support plate 22a may include various shapes other than the rectangular parallelepiped shape. In addition, the support plate 22a may be formed to support not only the Hall plate 32a, but also the pair of bias electrodes 32b and 32c and a portion of each of the pair of detection electrodes 32d and 32e.

The support unit 22 may include the first connection unit 22b, the second connection unit 22c, the third connection unit 22d, and the fourth connection unit 22e respectively supporting the pair of bias electrodes 32b and 32c and the pair of detection electrodes 32d and 32e. The first to fourth connection units 22b, 22c, 22d, and 22e may be configured to support meander pattern regions of the pair of bias electrodes 31b and 31c and the pair of detection electrodes 31d and 31e. For example, the first to fourth connection units 22b, 22c, 22d, and 22e may include meander patterns respectively corresponding to each of the pair of bias electrodes 32b and 32c and the pair of detection electrodes 32d and 32e. However, the disclosure is not limited thereto, and the first to fourth connection units 22b, 22c, 22d, and 22e may include a rod pattern extending in one direction. In addition, the first to fourth connection units 22b, 22c, 22d, and 22e may have an area less than the area of the support plate 22a. Heat generated by infrared absorption may be efficiently transferred to the superparamagnetic material layer 12 through a thermal isolation structure of the support unit 22, and as a result, an efficient conversion of infrared radiation into electrical energy may be achieved.

The support unit 22 may include at least one of silicon oxide and silicon nitride. Silicon oxide may include, for example, $SiO_2$. Silicon nitride may include, for example, $Si_3N_4$. However, the disclosure is not limited thereto, and the support unit 22 has a rigidity sufficient to support the superparamagnetic material layer 12 and may include various materials capable of efficiently absorbing infrared radiation.

In addition, all of the support plate 22a, the connection units 22b, 22c, 22d, and 22e, and the support columns 22f, 22g, 22h, and 22i may include at least one of silicon oxide and silicon nitride. In this case, the support plate 22a, the connection units 22b and 22c, and the support columns 22f and 22g may be formed as one body. However, the disclosure is not limited thereto, and the support plate 22a and the connection units 22b and 22c may be formed as one body, and the support columns 22f and 22g may be formed in a separate process.

In this way, when the superparamagnetic material layer 12 is provided to be separated from the substrate 200 by a predetermined height by the support unit 22, compared to a case when the substrate 200 and the superparamagnetic material layer 12 are in direct contact, the heat generated heat may be more efficiently transferred to the superparamagnetic material layer 12.

Meanwhile, the long-wave infrared detecting element 1200 may further include a reflection plate 40 on an upper surface of the substrate 200. The reflection plate 40 may be provided in a region corresponding to the support plate 22a. In addition, the reflection plate 40 may have an area the same as the area of the support plate 22a. The reflection plate 40 may include a metal, such as gold (Au) or aluminum (Al). However, the disclosure is not limited thereto, and the reflection plate 40 may include various materials having high reflectivity. Infrared rays that have passed through the support unit 22 and reached the reflection plate 40 may be reflected from the reflection plate 40 and propagate to the support unit 22. Accordingly, infrared absorption by the support unit 22 may be enhanced. However, the disclosure is not limited thereto, and as shown in FIG. 14, the long-wave infrared detecting element 1300 may not include a reflection plate.

Figure 16:
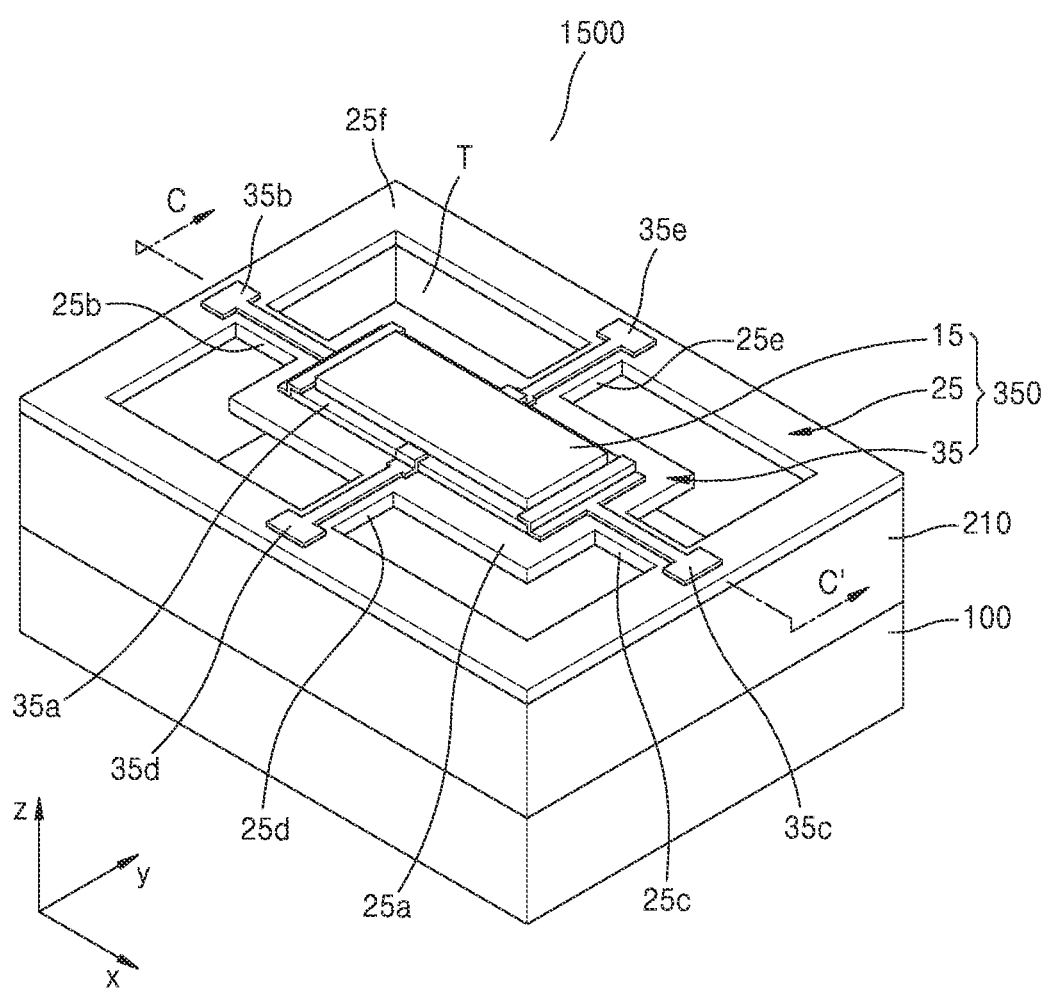
FIG. 16 is a schematic perspective view showing a configuration of a long-wave infrared detecting element according to an embodiment.
Figure 17:
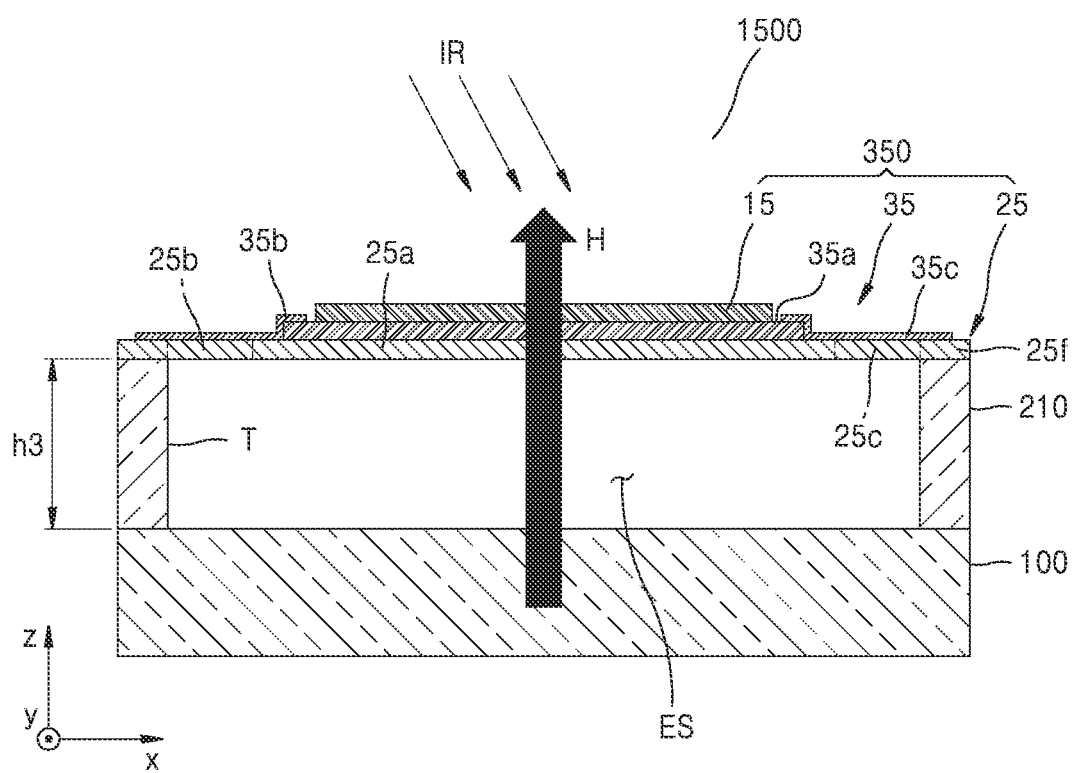
FIG. 17 is a schematic cross-sectional view taken along line C-C' of FIG. 16.
Figure 18:
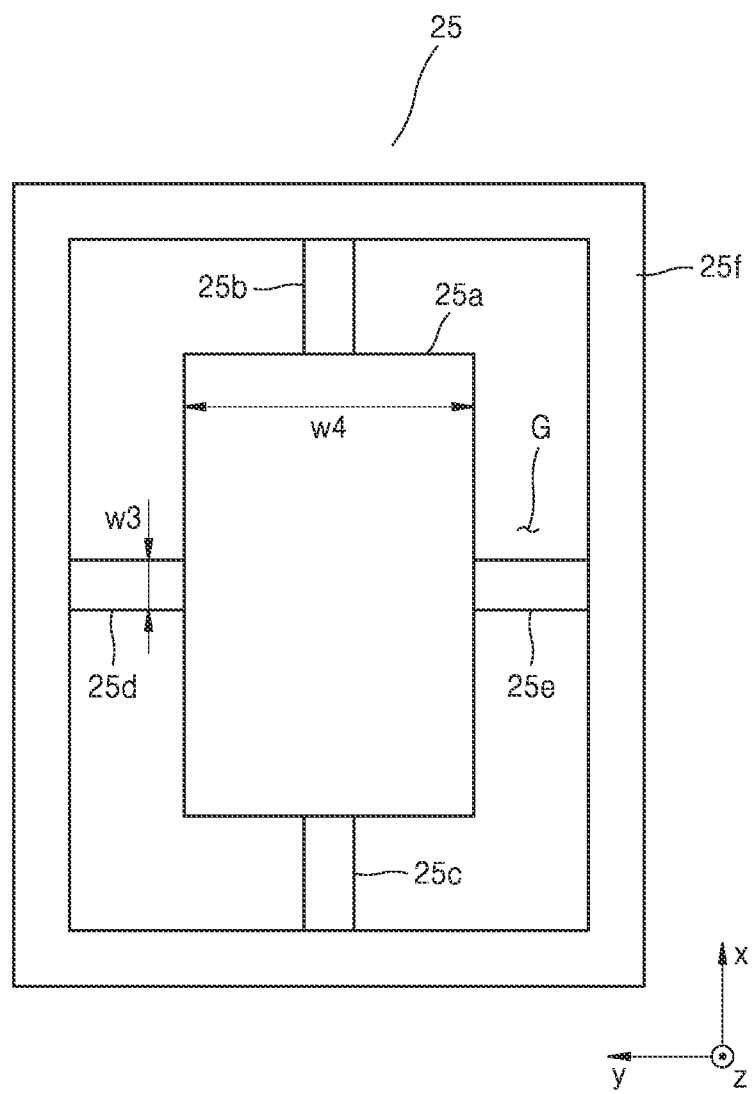
FIG. 18 is a schematic plan view of a configuration of a support unit included in the long-wave infrared detecting element of FIG. 16.

FIG. 16 is a schematic perspective view showing a configuration of a long-wave infrared detecting element 1500 according to an embodiment. FIG. 17 is a schematic cross-sectional view taken along line C-C' of FIG. 16. FIG. 18 is a schematic plan view showing a configuration of a support unit 25 included in the long-wave infrared detecting element 1500 of FIG. 16.

The functions of the superparamagnetic material layer 15 and the magneto-electric conversion unit 35 shown in FIGS. 16 and 17 may be substantially the same as the functions of the superparamagnetic material layer 11 and the magneto-electric conversion unit 31 shown in FIGS. 2 and 3. In describing the long-wave infrared detecting elements 1500 of FIGS. 16 and 17, descriptions previously given with reference to FIGS. 2 to 11 will be omitted.

Referring to FIGS. 16 and 17, the long-wave infrared detecting element 1500 may include a magnetic field generator 100 configured to generate a magnetic field, a substrate 210 on the magnetic field generator 100, and a thermo-electromagnetic detection unit 350 provided on the substrate 210 to absorb the incident infrared radiation and to generate an electrical signal that changes according to a temperature that changes due to the amount of the infrared radiation absorption. The magnetic field generator 100 is the same as the description given with reference to FIG. 1. For example, the magnetic field generator 100 may generate a magnetic field H having a uniform intensity in a vertical direction (z-axis direction). The magnetic field H may act on the thermo-electromagnetic detection unit 350.

The substrate 210 may be a base layer for forming the thermo-electromagnetic detection unit 350. The substrate 210 may include, for example, a silicon (Si) substrate. However, the disclosure is not limited thereto, and the substrate 210 may include various materials.

A trench T formed by etching a portion of the substrate 210 may be provided in the substrate 210. As shown in FIG. 17, a predetermined empty space ES may be formed inside the trench T. As illustrated in FIG. 16, through the trench T, a part of the magnetic field generator 100 may be exposed to the outside. The depth h3 of the trench T may correspond to ¼ of a center wavelength of infrared rays IR incident on the support unit 25. For example, when a center wavelength of infrared rays IR incident on the support unit 25 is 10 μm, the depth h3 of the trench T may be 2.5 μm. Accordingly, the support unit 25 and the magnetic field generator 100 may be separated by the depth h3 of the trench T. In this case, an optical resonance may occur between the support unit 25 and the magnetic field generator 100, and the infrared radiation absorption by the support unit 25 may be enhanced.

The thermo-electromagnetic detection unit 350 may include a superparamagnetic material layer 15 separated from the substrate 200 and magnetized by a magnetic field H generated by the magnetic field generator 100, a support unit 25 provided on the substrate 200 to support the superparamagnetic material layer 15 such that the superparamagnetic material layer 15 is separated from the substrate 200, and generate heat by absorbing infrared radiation from the outside, and a magneto-electric conversion unit 35 configured to generate an electrical signal according to the strength of the magnetic field H generated by the magnetic field generator 100 and the magnetization of the superparamagnetic material layer 15.

The magneto-electric conversion unit 35 may be configured to generate an electrical signal according to the strength of the magnetic field H generated by the magnetic field generator 100 and the magnetization of the superparamagnetic material layer 15. The magneto-electric conversion unit 35 may be provided to be separated from the substrate 200. For example, the magneto-electric conversion unit 35 may be provided on the support unit 25. In this case, as shown in FIGS. 16 and 17, the superparamagnetic material layer 15 may be provided on the magneto-electric conversion unit 35. Accordingly, the magneto-electric conversion unit 35 and the superparamagnetic material layer 15 may be sequentially stacked on the support unit 25. However, the disclosure is not limited thereto, and the superparamagnetic material layer 15 may be provided between the support unit 25 and the magneto-electric conversion unit 35.

The magneto-electric conversion unit 35 may include a Hall plate 35a, a pair of bias electrodes 35b and 35c provided at both edges of the Hall plate 35a in the first direction (x-axis direction), and at least one pair of detection electrodes 35d and 35e provided at both edges of the Hall plate 35a in the second direction (y-axis direction) perpendicular to the first direction (x-axis direction). In this case, both the first direction (x-axis direction) and the second direction (y-axis direction) may be directions perpendicular to a direction of the magnetic field H (z-axis direction) generated by the magnetic field generator 100.

When the Hall plate 35a has a rectangular parallelepiped shape, the pair of bias electrodes 35b and 35c may be formed to cover the two edges facing each other in the first direction (x-axis direction) of the Hall plate 35a, respectively. The pair of bias electrodes 35b and 35c may be provided on a straight line parallel to the first direction (x-axis direction). For example, the pair of bias electrodes 35b and 35c are formed extending in the second direction (y-axis direction), and cover two edges facing each other in the first direction (x-axis direction) of the Hall plate 35a, respectively. In addition, the pair of bias electrodes 35b and 35c may be formed in a stepwise manner to cover two edges facing each other in the first direction (x-axis direction) of the Hall plate 35a, and may contact a portion of an upper surface of a support plate 25a which will be described later. Also, the pair of bias electrodes 35b and 35c may include a pattern extending from the Hall plate 35a. For example, the pair of bias electrodes 35b and 35c may include a rod pattern formed parallel to the first direction (x-axis direction) and extending in one direction away from the Hall plate 35a.

In this case, the pair of detection electrodes 35d and 35e may be formed where portions of the pair of detection electrodes 35d and 35e respectively contact two edges facing each other in the second direction (y-axis direction) of the Hall plate 35a. The pair of detection electrodes 35d and 35e may be provided on a straight line parallel to the second direction (y-axis direction). Further, the pair of detection electrodes 35d and 35e may include a pattern extending from the Hall plate 35a while in contact with the Hall plate 35a. For example, the pair of detection electrodes 35d and 35e may include a bar pattern parallel to the second direction (y-axis direction) and extending in one direction away from the Hall plate 35a. The pair of detection electrodes 35d and 35e are formed in a stepwise manner to contact each of two edges facing each other in the second direction (y-axis direction) of the Hall plate 35a, and at the same time, may contact a portion of an upper surface of a support plate 25a which will be described later.

The support unit 25 may include a support plate 25a on a trench T to support the Hall plate 35a, an edge element 25f provided to surround the support plate 25a by being separated from the support plate 25a, and at least one connection element 25b, 25c, 25d, and 25e connecting the support plate 25a and the edge element 25f.

The support plate 25a may include a rectangular parallelepiped shape. For example, the support plate 25a may have a thin plate shape. The support plate 25a may be located in the center of a region where the trench T is formed. In addition, the support plate 25a may be formed to support not only the Hall plate 35a, but also a portion of the pair of bias electrodes 35b and 35c and a portion of the pair of detection electrodes 35d and 35e.

The edge element 25f may be provided to cover an upper surface of the substrate 210. In this case, the edge element 25f may be provided to cover an edge of the upper surface of the substrate 210 remaining after the trench T is formed.

In this way, because the support plate 25a is located in the center of the region where the trench T is formed and the edge element 25f is provided to cover the edge of the upper surface of the substrate 210, the edge element 25f may be provided to surround the support plate 25a. Further, the support plate 25a and the edge element 25f may be provided on the same plane. In this case, as shown in FIG. 18, a gap G may be formed between the support plate 25a and the edge element 25f. The at least one connection element 25b, 25c, 25d, and 25e may be provided between the support plate 25a and the edge element 25f that are separated from each other with the gap G. Also, areas of each of the first to fourth connection elements 25b, 25c, 25d, and 25e may be less than the area of the support plate 25a. Heat generated by infrared absorption may be efficiently transferred to the superparamagnetic material layer 15 through a thermal isolation structure of the support unit 25, and as a result, the transformation of infrared radiation into electrical energy may be enhanced.

For example, the support unit 25 may include a first connection element 25b and a second connection element 25c connecting both edges of the support plate 25a in the first direction (x-axis direction) to the edge element 25f. In addition, the support unit 25 may include a third connecting element 25d and a fourth connecting element 25e connecting both edges of the support plate 25a in the second direction (y-axis direction) to the edge element 25f. The first to fourth connection elements 25b, 25c, 25d, and 25e may be provided to support a pair of bias electrodes 35b and 35c and a pair of detection electrodes 35d and 35e, respectively. For example, portions of each of the pair of bias electrodes 35b and 35c and the pair of detection electrodes 35d and 35e formed by extending in respective directions from the Hall plate 35a (see, e.g., FIG. 18) may be supported by the first connection element 25b, the second connection element 25c, the third connection element 25d, and the fourth connection element 25e.

The support plate 25a, the first to fourth connection elements 25b, 25c, 25d, and 25e, and the edge element 25f may be provided on the same plane. Also, the support plate 25a, the first to fourth connection elements 25b, 25c, 25d, and 25e, and the edge element 25f may be formed as one body.

The support unit 25 may include at least one of silicon oxide and silicon nitride. Silicon oxide may include, for example, $SiO_2$. Silicon nitride may include, for example, $Si_3N_4$. However, the disclosure is not limited thereto, and the support unit 25 has a rigidity sufficient to support the superparamagnetic material layer 15 and the magneto-electric conversion unit 35, and may include various materials capable of efficiently absorbing infrared radiation.

In this way, when the superparamagnetic material layer 15 is provided on an empty space ES formed inside the trench T of the substrate 210 and is separated from the substrate 210 by the support unit 25, compared to a case when the substrate 210 and the superparamagnetic material layer 15 are in direct contact, heat generated by infrared absorption may be more efficiently transferred to the superparamagnetic material layer 15.

Figure 19:
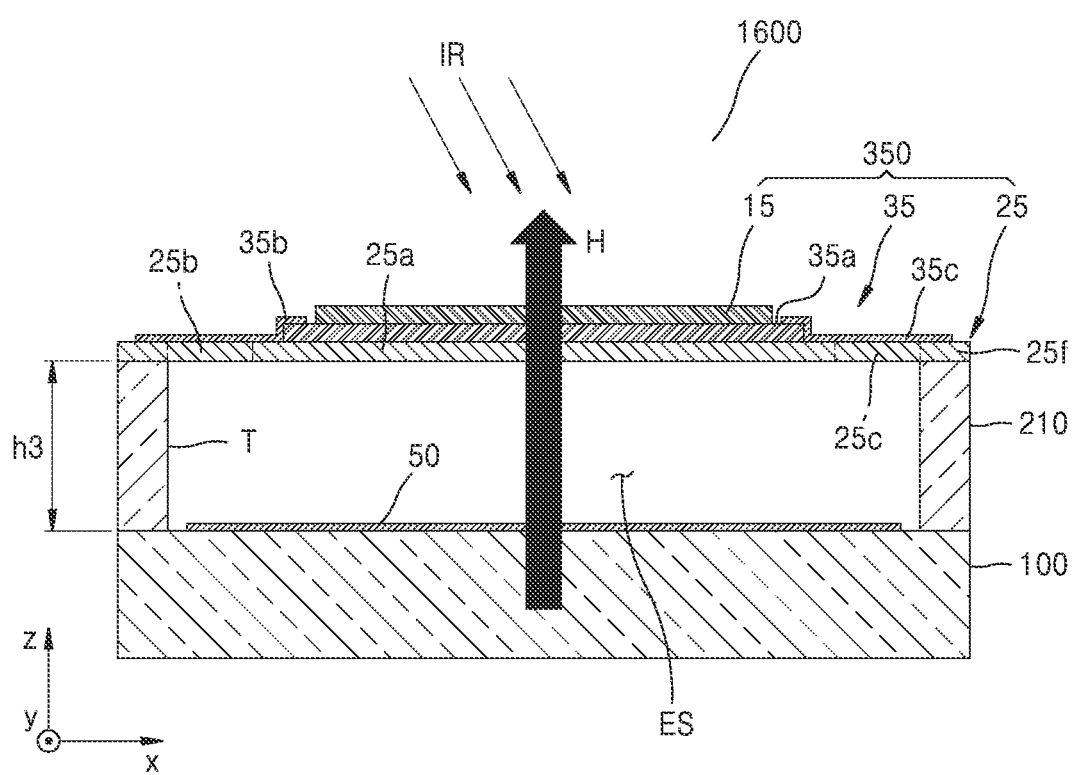
FIG. 19 is a schematic cross-sectional view of a configuration of a long-wave infrared detecting element according to an embodiment.

FIG. 19 is a schematic perspective view showing a configuration of a long-wave infrared detecting element 1600 according to an embodiment. The long-wave infrared detecting element 1600 of FIG. 19 may be substantially the same as the long-wave infrared detecting element 1500 of FIG. 16 except that the long-wave infrared detecting element 1600 further includes a reflection plate 50. In describing the long-wave infrared detecting element 1600 of FIG. 19, descriptions previously given with reference to FIGS. 2 to 11 will be omitted.

Referring to FIG. 19, the long-wave infrared detecting element 1600 may further include the reflection plate 50 provided on an upper surface of the magnetic field generator 100. For example, the reflection plate 50 may be provided inside a trench T. The reflection plate 50 may be provided in a region corresponding to the support plate 25*a*. In addition, the reflection plate 50 may have an area the same as the area of the support plate 25*a*. The reflection plate 50 may include a metal, such as gold (Au) or aluminum (Al). However, the disclosure is not limited thereto, and the reflection plate 50 may include various materials having high reflectivity. Infrared rays that have passed through the support unit 25 and reached the reflection plate 50 may be reflected from the reflection plate 50 and propagate to the support unit 25. Accordingly, infrared radiation absorption by the support unit 25 may be enhanced.

Figure 20:
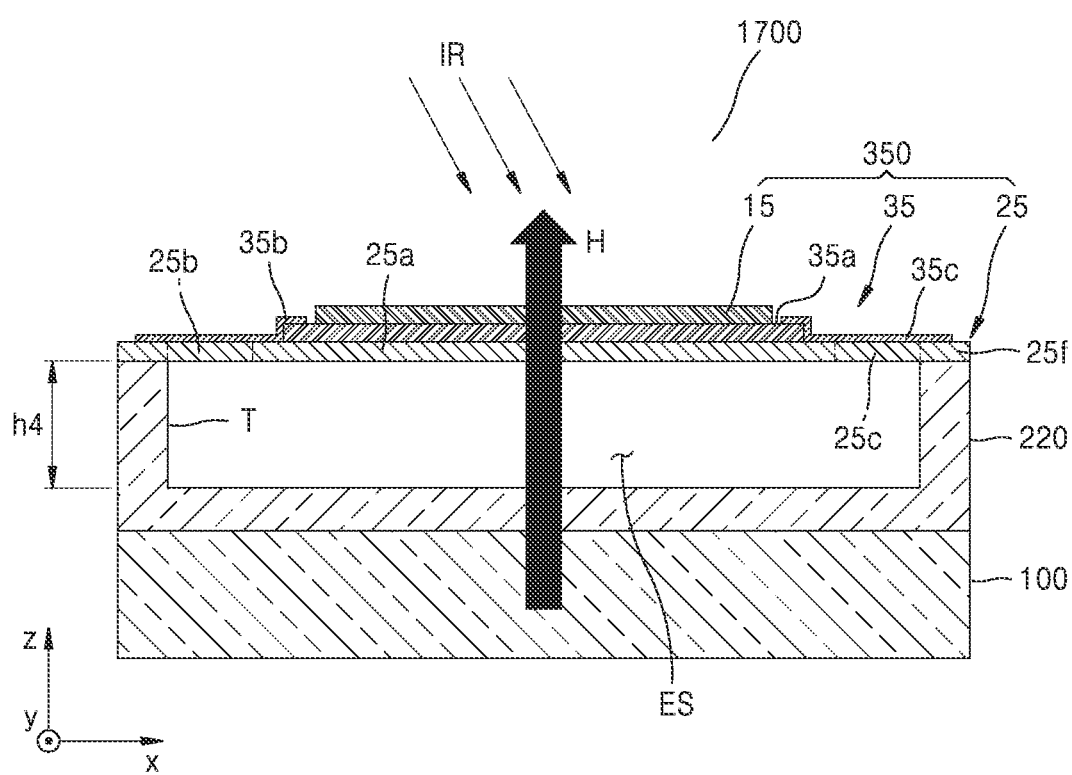
FIG. 20 is a schematic cross-sectional view of a configuration of a long-wave infrared detecting element according to an embodiment.

FIG. 20 is a schematic perspective view showing a configuration of a long-wave infrared detecting element 1700 according to an embodiment. The long-wave infrared detecting element 1700 of FIG. 20 may be substantially the same as the long-wave infrared detecting element 1500 of FIG. 16 except that the magnetic field generator 100 is not exposed to the outside through the trench T in the long-wave infrared detecting element 1700. In describing the long-wave infrared detecting element 1700 of FIG. 20, descriptions previously given with reference to FIGS. 16 to 18 will be omitted.

Referring to FIG. 20, a trench T formed by etching a portion of a substrate 220 may be provided in the substrate 220. A predetermined empty space ES may be formed inside the trench T. The trench T may be formed so as not to completely penetrate the substrate 220. Accordingly, as illustrated in FIG. 20, the magnetic field generator 100 may be covered by the substrate 220 and may not be exposed to the outside. The trench T may have a depth h4 corresponding to ¼ of a center wavelength of the infrared rays IR incident on the support unit 25. For example, when a center wavelength of an infrared ray incident on the support unit 25 is 10 μm, the depth h4 of the trench T may be 2.5 μm. Accordingly, the support unit 25 and the substrate 220 may be formed to be separated by the depth h4 of the trench T. In this case, an optical resonance may occur between the support unit 25 and the substrate 220, and the absorption of an infrared radiation by the support unit 25 may be enhanced.

Figure 21:
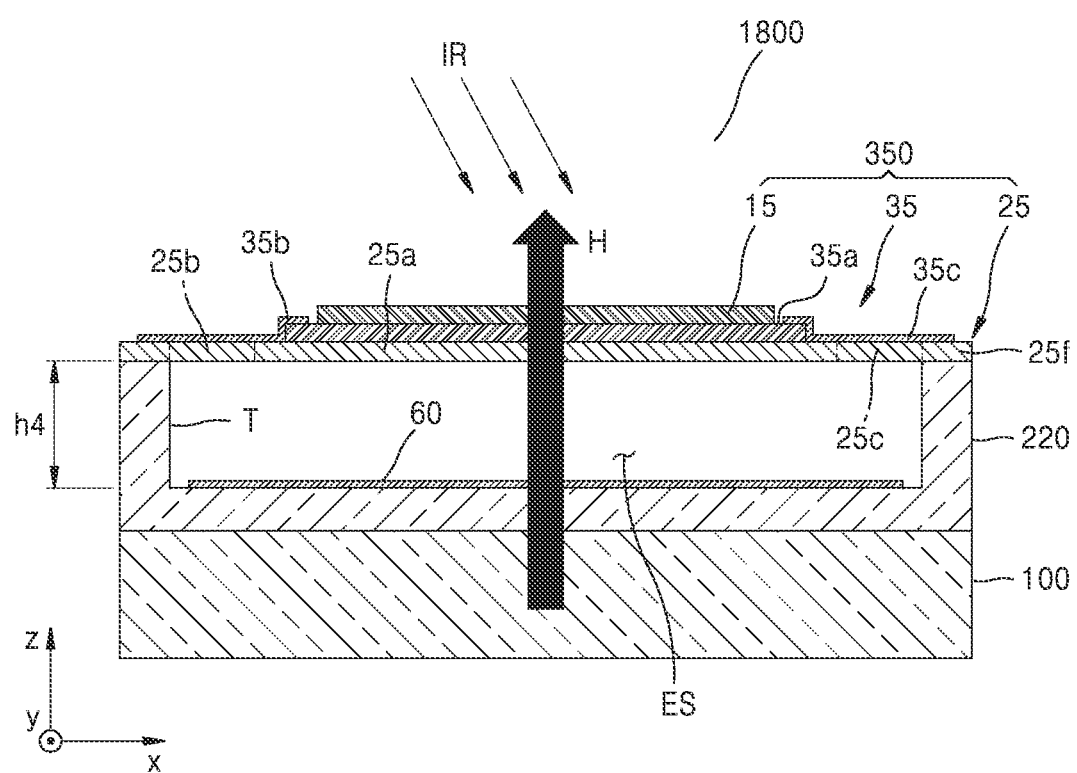
FIG. 21 is a schematic cross-sectional view of a configuration of a long-wave infrared detecting element according to an embodiment.

FIG. 21 is a schematic perspective view showing a configuration of a long-wave infrared detecting element 1800 according to an embodiment. The long-wave infrared detecting element 1800 of FIG. 21 may be substantially the same as the long-wave infrared detecting element 1700 of FIG. 20 except that the long-wave infrared detecting element 1800 further includes a reflection plate 60. In describing the long-wave infrared detecting element 1800 of FIG. 21, descriptions previously given with reference to FIGS. 18 to 20 will be omitted.

Referring to FIG. 21, the long-wave infrared detecting element 1800 may further include the reflection plate 60 provided on the substrate 220. For example, the reflection plate 60 may be arranged inside the trench T. The reflection plate 60 may be provided in a region corresponding to the support plate 25*a*. In addition, the reflection plate 60 may have an area the same as the area of the support plate 25*a*. The reflection plate 60 may include a metal, such as gold (Au) or aluminum (Al). However, the disclosure is not limited thereto, and the reflection plate 60 may include various materials having high reflectivity. Infrared rays that have passed through the support unit 25 and reached the reflection plate 60 may be reflected from the reflection plate 60 and propagates to support unit 25. Accordingly, infrared radiation absorption by the support unit 25 may be enhanced.

Figure 22:
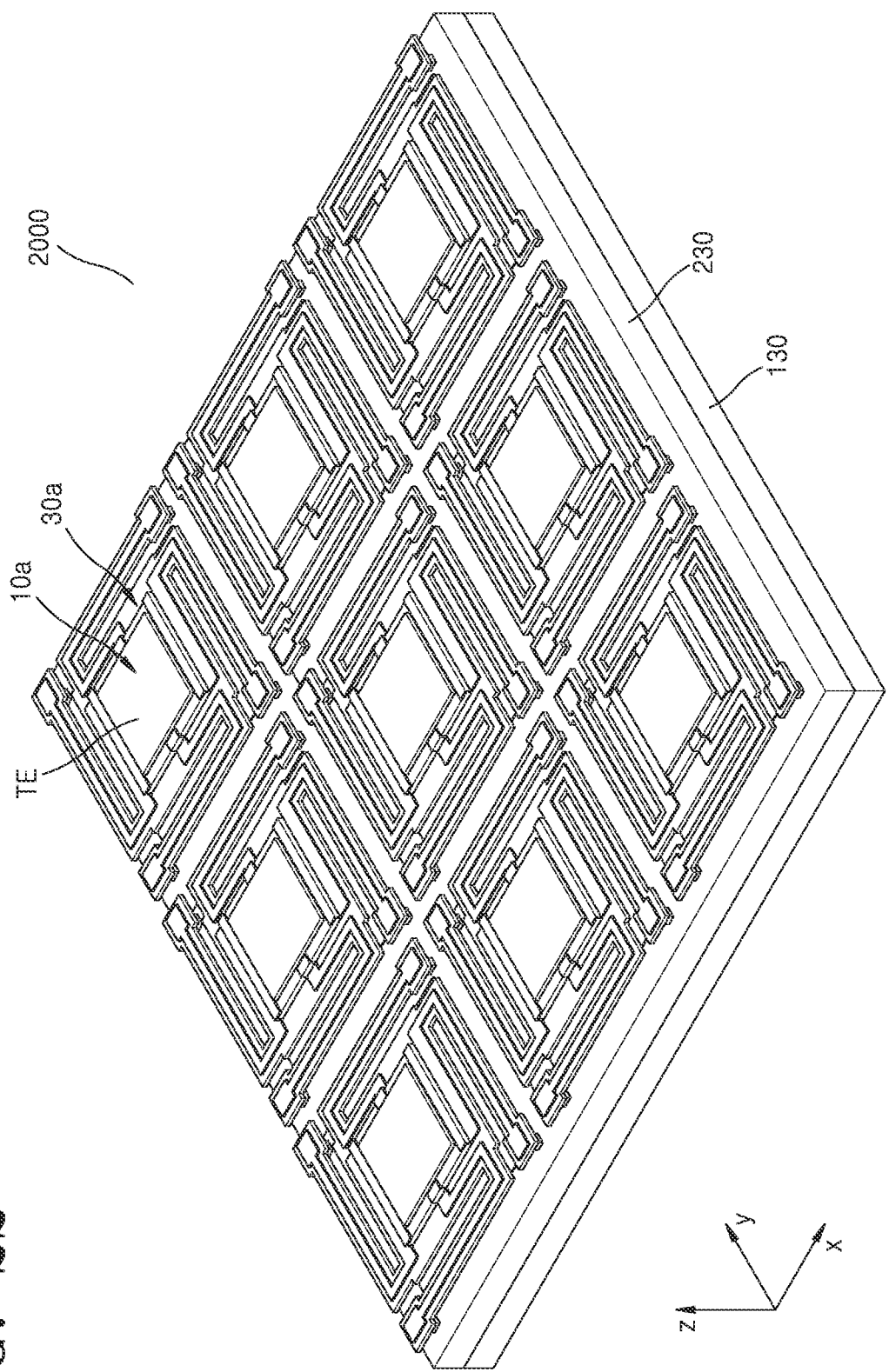
FIG. 22 is a schematic perspective view showing a configuration of a long-wave infrared detecting element array structure according to an embodiment.

FIG. 22 is a schematic perspective view illustrating a configuration of a long-wave infrared detecting element array structure 2000 according to an embodiment.

Referring to FIG. 22, the long-wave infrared detecting element array structure 2000 may include a plurality of long-wave infrared detecting elements TE. For example, the plurality of long-wave infrared detecting elements TE may be arranged in a predetermined pattern on a two-dimensional plane. Although nine long-wave infrared detecting elements TE are shown in FIG. 22, the disclosure is not limited thereto, and the long-wave infrared detecting element array structure 2000 may include a lot of long-wave infrared detecting elements TE. For example, the long-wave infrared detecting element array structure 2000 may include 160×120 or 640×480 long-wave infrared detecting elements TE.

Each of the plurality of long-wave infrared detecting elements TE may detect infrared radiation by measuring an electrical signal of a magneto-electric conversion unit 30*a* that changes according to temperature of a superparamagnetic material layer 10*a* due to the amount of the infrared radiation absorption by using a superparamagnetic material layer 10*a* and a magneto-electric conversion unit 30*a*. Each of the plurality of long-wave infrared detecting elements TE may include any one of the various long-wave infrared detecting elements 1000, 1100, 1200, 1300, 1400, 1500, 1600, 1700, 1800 described with reference to FIGS. 1 to 21. The long-wave infrared detecting element array structure 2000 may include a one body magnetic field generator 130 and a one body substrate 230.

Figure 23:
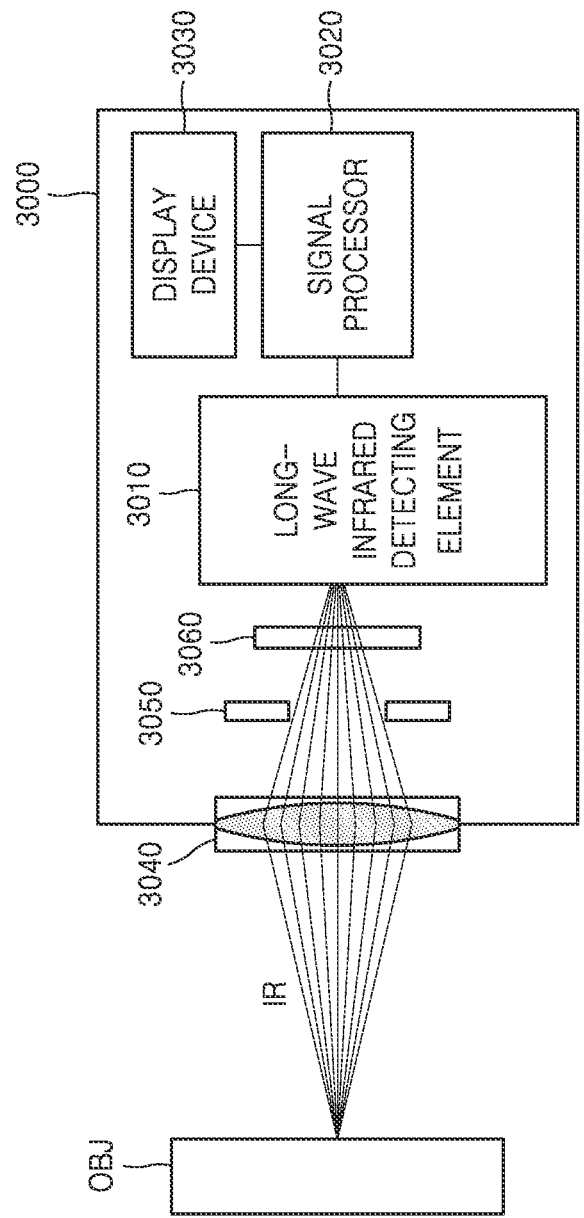
FIG. 23 is a schematic diagram of a configuration of a long-wave infrared temperature detecting device according to an embodiment.

FIG. 23 is a schematic diagram of a configuration of a long-wave infrared temperature detecting device 3000 according to an embodiment.

Referring to FIG. 23, the long-wave infrared temperature detecting device 3000 may include a long-wave infrared detecting element 3010 configured to absorb infrared radiation emitted from an object OBJ and detects an electrical signal that changes according to the infrared radiation absorption, a signal processor 3020 configured to process an electrical signal transmitted from the long-wave infrared detecting element 3010, and a display device 3030 configured to display an image generated by an electrical signal processed by the signal processor 3020.

The long-wave infrared detecting element 3010 may detect an amount of infrared radiation emitted from the object OBJ by measuring an electrical signal that changes according to a temperature that changes due to the amount of the infrared radiation absorbed by a superparamagnetic material layer and a magneto-electric conversion unit. The long-wave infrared detecting element 3010 may include any one of various long-wave infrared detecting elements 1000, 1100, 1200, 1300, 1400, 1500, 1600, 1700, 1800 described with reference to FIGS. 1 to 21.

The long-wave infrared temperature detecting device 3000 may include a predetermined optical system configured to efficiently transmit infrared rays IR to the long-wave infrared detecting element 3010. For example, the long-wave infrared temperature detecting device 3000 may include an optical lens 3040 configured to focus the infrared rays IR from the outside on the long-wave infrared detecting element 3010. The optical lens 3040 may include an infrared optical lens. In addition, the long-wave infrared temperature detecting device 3000 may further include an aperture 3050 provided between the optical lens 3040 and the long-wave infrared detecting element 3010 to control an amount of infrared rays IR and an optical filter 3060 provided between the optical lens 3040 and the long-wave infrared detecting element 3010 to selectively transmit the infrared rays IR in a specific wavelength band that has passed through the optical lens. For example, the optical filter 3060 may transmit infrared rays IR in a wavelength band in a range of about 8 μm to about 14 μm. However, the disclosure is not limited thereto, and the transmit wavelength band of the optical filter 3060 may be variously set.

The signal processor 3020 may process an electrical signal transmitted from the long-wave infrared detecting element 3010. For example, the signal processor 3020 may convert an analog signal transmitted from the long-wave infrared detecting element 3010 into a digital signal by using an analog-to-digital converter (ADC). The signal processor 3020 may estimate the temperature of the object OBJ by comparing an amount of infrared radiation of the object OBJ measured by the long-wave infrared detecting element 3010 with an amount of radiation of a blackbody. A temperature signal processed by the signal processor 3020 may be transmitted to the display device 3030. The display device 3030 may display an image representing the temperature by using a temperature signal transmitted from the signal processor 3020.

The display device 3030 may include a liquid crystal display device, an organic light-emitting display device, etc. However, the disclosure is not limited thereto, and the display device 3030 may include various structures for displaying images by using electric signals other than the liquid crystal display device and the organic light-emitting display device.

Figure 24:
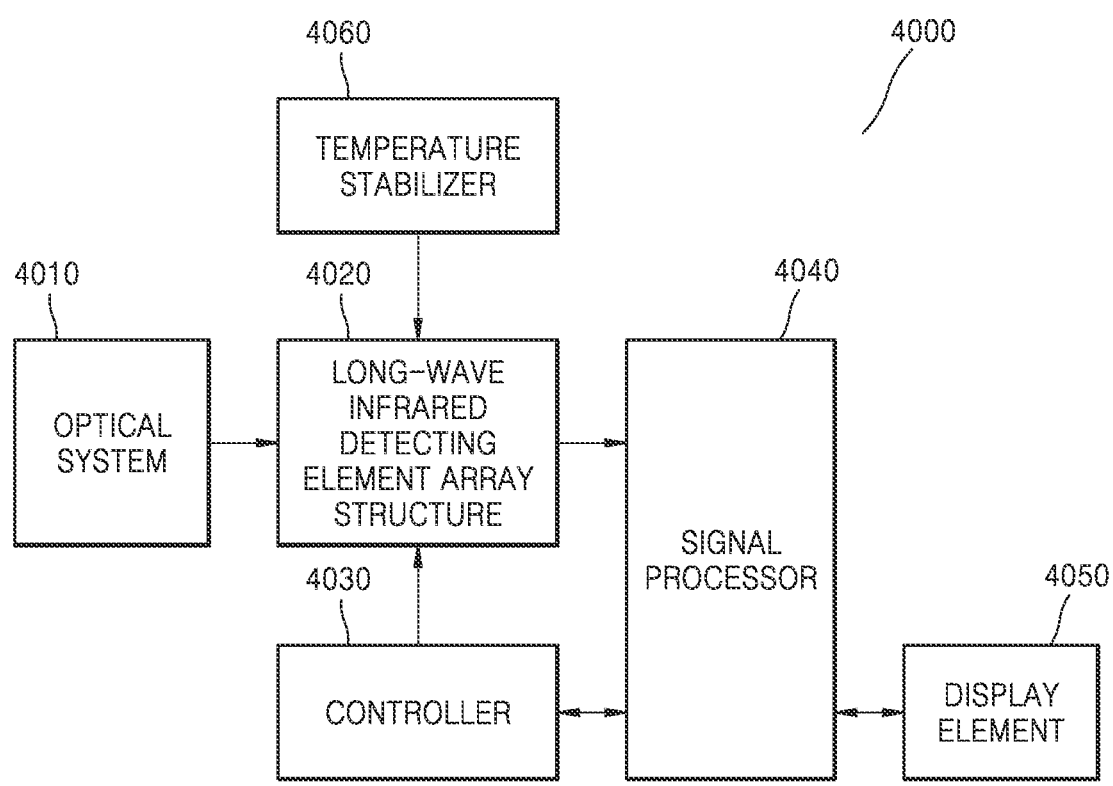
FIG. 24 is a block diagram schematically illustrating a configuration of a thermal imaging device according to an embodiment.

FIG. 24 is a schematic block diagram illustrating a configuration of a thermal imaging device 4000 according to an embodiment.

Referring to FIG. 24, the thermal imaging device 4000 may include: an optical system 4010 configured to focus the infrared rays from the outside; a long-wave infrared detecting element array structure 4020 including a plurality of long-wave infrared detecting elements configured to detect infrared rays transmitted from the optical system 4010; a controller 4030 configured to control the operation of a plurality of long-wave infrared detecting elements included in the long-wave infrared detecting element array structure 4020; a signal processor 4040 configured to process an electrical signal transmitted from the long-wave infrared detecting element array structure 4020; and a display element 4050 configured to display an image generated by an electrical signal processed by the signal processor 4040.

The optical system 4010 may include, for example, an infrared optical lens. The infrared optical lens may focus the infrared rays from the outside on the long-wave infrared detecting element array structure 4020.

The long-wave infrared detecting element array structure 4020 may include a plurality of long-wave infrared detecting elements configured to detect an amount of infrared radiation by measuring the electrical signal that is changed according to a temperature that changes due to the amount of the infrared radiation by using a superparamagnetic material layer and a magneto-electric conversion unit. The long-wave infrared detecting element array structure 4020 may include the long-wave infrared detecting element array structure 2000 described with reference to FIG. 22. Each of the plurality of long-wave infrared detecting elements included in the long-wave infrared detecting element array structure 4020 may be one pixel. Accordingly, the long-wave infrared detecting element array structure 4020 may include a plurality of pixels. The plurality of pixels of the long-wave infrared detecting element array structure 4020 may correspond to a plurality of pixels included in the display element 4050, respectively.

The controller 4030 may control the operation of the long-wave infrared detecting element array structure 4020. For example, the application of a current signal or a voltage signal to each of a plurality of long-wave infrared detecting elements included in the long-wave infrared detecting element array structure 4020 may be independently controlled. Accordingly, the driving of a plurality of long-wave infrared detecting elements included in the long-wave infrared detecting element array structure 4020 may be sequentially performed. However, the disclosure is not limited thereto, and the controller 4030 may control the driving of the plurality of long-wave infrared detecting elements in the long-wave infrared detecting element array structure 4020 in various ways.

The controller 4030 may include at least one of, for example, a central processing unit, a microprocessor, a graphic processing unit, application specific integrated circuits (ASICs), digital signal processors (DSPs), digital signal processing devices (DSPDs), programmable logic devices (PLDs), and field programmable gate arrays (FPGAs), but are not limited thereto.

The signal processor 4040 may process an electrical signal transmitted from the long-wave infrared detecting element array structure 4020. For example, the signal processor 4020 may convert an analog signal transmitted from the long-wave infrared detecting element array structure 4020 into a digital signal by using an analog-to-digital converter (ADC). In addition, the signal processing operation of the signal processor 4040 may be a basis for controlling the long-wave infrared detecting element array structure 4020 by the controller 4030. For example, according to an aspect of processing a signal by the signal processor 4040, the aspect of controlling of the long-wave infrared detecting element array structure 4020 by the controller 4030 may be determined. Further, the signal processing by the signal processor 4040 may be controlled by the controller 4030. A signal processed by the signal processor 4040 may be transmitted to the display element 4050. The display element 4050 may display an image representing a temperature of an object by using a signal transmitted from the signal processor 4040.

The display element 4050 may include a liquid crystal display device, an organic light-emitting display device, etc. However, the disclosure is not limited thereto, and the display element 4050 may include various structures for displaying an image using electrical signals other than the liquid crystal display device and the organic light emitting display device.

The thermal imaging device 4000 may further include a temperature stabilizer 4060 configured to maintain a constant ambient temperature so that the long-wave infrared detecting element array structure 4020 is operated under a constant temperature. For example, the temperature stabilizer 4060 may be provided under the magnetic field generator of a plurality of long-wave infrared detecting elements included in the long-wave infrared detecting element array structure 4020.

Various embodiments described above are only examples, and thus, it will be understood by those skilled in the art that various changes in form and details may be made therein without departing from the spirit and scope of the disclosure. Accordingly, the scope of the disclosure is defined not by the detailed description but by the appended claims.

According to various embodiments of the disclosure, a miniaturized long-wave infrared detecting element, a long-wave infrared detecting element array structure, a long-wave infrared temperature detecting device, and a thermal imaging device may be provided by using a phenomenon in which the magnetization of a superparamagnetic material layer changes according to a temperature under constant magnetic field.

According to various embodiments of the disclosure, a long-wave infrared detecting element capable of detecting infrared radiation in real time, a long-wave infrared detecting element array structure including the long-wave infrared detecting element, a long-wave infrared temperature detecting device, and a thermal imaging device may be provided by including a structure in which infrared radiation absorbed by the thermo-electromagnetic conversion unit is efficiently converted into electrical energy.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A long-wave infrared detecting element comprising:
a magnetic field generator configured to generate a magnetic field;
a substrate on the magnetic field generator;
a superparamagnetic material layer separated from the substrate and magnetized by the magnetic field generated by the magnetic field generator;
a support unit on the substrate, the support unit supporting the superparamagnetic material layer such that the superparamagnetic material layer is separated from the substrate, such that the support unit and the superparamagnetic material layer generate heat by absorbing infrared radiation from an outside; and
a magneto-electric conversion unit configured to generate an electrical signal proportional to both a strength of the magnetic field generated by the magnetic field generator and a magnetization of the superparamagnetic material layer,
wherein the magnetization of the superparamagnetic material layer changes according to a temperature of the superparamagnetic material layer,
wherein the temperature of the superparamagnetic material layer changes according to an amount of the infrared radiation absorbed directly by the superparamagnetic material layer and according to an amount of the infrared radiation absorbed by the support unit, and
wherein the magneto-electric conversion unit is provided on the support unit.

2. The long-wave infrared detecting element of claim 1, wherein the magnetization of the superparamagnetic material layer changes linearly according to the temperature of the superparamagnetic material layer.

3. The long-wave infrared detecting element of claim 1, wherein the magneto-electric conversion unit comprises a Hall plate, a first bias electrode provided at a first edge of the Hall plate, a second bias electrode provided at a second edge of the Hall plate opposite to the first edge of the Hall plate in a first direction, at least one first detection electrode provided at a third edge of the Hall plate, and at least one second detection electrode provided at a fourth edge of the Hall plate opposite to the third edge of the Hall plate in a second direction perpendicular to the first direction, and
wherein both the first direction and the second direction are perpendicular to a direction of the magnetic field generated by the magnetic field generator.

4. The long-wave infrared detecting element of claim 3, wherein the support unit comprises a support plate for supporting the superparamagnetic material layer, a plurality of support columns protruding from an upper surface of the substrate in a vertical direction, and a plurality of connection units wherein each of the plurality of connection units connects the support plate to an upper portion of a respective support column of the plurality of support columns, and
wherein the support plate and the plurality of support columns are separated from each other on a plane perpendicular to the vertical direction.

5. The long-wave infrared detecting element of claim 4, wherein each of the plurality of connection units has an area less than an area of the support plate.

6. The long-wave infrared detecting element of claim 4, wherein each of the plurality of connection units comprises a respective meander pattern.

7. The long-wave infrared detecting element of claim 4, wherein the support plate comprises at least one of silicon oxide and silicon nitride.

8. The long-wave infrared detecting element of claim 3, wherein the Hall plate comprises a rectangular parallelepiped shape.

9. The long-wave infrared detecting element of claim 3, wherein a trench is formed in the substrate by etching a portion of the substrate, and the Hall plate is provided on an empty space formed by the trench.

10. The long-wave infrared detecting element of claim 9, wherein the support unit comprises a support plate provided on the empty space formed by the trench to support the Hall plate, an edge element separated from the support plate to surround the support plate, and at least one connection element connecting the support plate to the edge element.

11. The long-wave infrared detecting element of claim 10, wherein the first bias electrode, the second bias electrode, the at least one first detection electrode, and the at least one second detection electrode are formed to extend in respective directions away from the Hall plate, and
wherein the at least one connection element comprises a first connection element, a second connection element, a third connection element, and a fourth connection element respectively supporting the first bias electrode, the second bias electrode, the at least one first detection electrode, and the at least one second detection electrode.

12. The long-wave infrared detecting element of claim 9, further comprising a reflection plate inside the trench.

13. The long-wave infrared detecting element of claim 3, further comprising a reference conversion unit comprising a conductive reference plate, a protective layer covering the conductive reference plate, a third bias electrode provided at a first edge of the conductive reference plate, a fourth bias electrode provided at a second edge of the conductive reference plate opposite to the first edge of the conductive reference plate in the first direction, at least one third detection electrode provided at a third edge of the conductive reference plate, and at least one fourth detection electrode provided at a fourth edge of the conductive reference plate opposite to the third edge of the conductive reference plate in the second direction,
wherein the magneto-electric conversion unit and the reference conversion unit constitute a differential amplifier circuit.

14. The long-wave infrared detecting element of claim 1, wherein the magneto-electric conversion unit contacts an upper surface of the substrate.

15. The long-wave infrared detecting element of claim 1,
wherein each of the first bias electrode, the second bias electrode, the at least one first detection electrode, and the at least one second detection electrode comprises a respective pattern extending from the Hall plate,
wherein the plurality of connection units comprises a first connection unit, a second connection unit, a third connection unit, and a fourth connection unit respectively supporting the first bias electrode, the second bias electrode, the at least one first detection electrode, and the at least one second detection electrode, and
wherein the plurality of support columns comprises a first support column, a second support column, a third support column, and a fourth support column respectively connected to the first to fourth connection units.

16. The long-wave infrared detecting element of claim 15, wherein each of the first bias electrode, the second bias electrode, the at least one first detection electrode, and the at least one second detection electrode comprises a respective meander pattern.

17. The long-wave infrared detecting element of claim 1, wherein the superparamagnetic material layer is provided on the magneto-electric conversion unit.

18. The long-wave infrared detecting element of claim 17, further comprising a reflection plate on the upper surface of the substrate.

19. The long-wave infrared detecting element of claim 1, wherein the superparamagnetic material layer is provided between the support unit and the magneto-electric conversion unit.

20. A long-wave infrared detecting element array structure comprising a plurality of long-wave infrared detecting elements, each of the plurality of long-wave infrared detecting elements comprising:
a magnetic field generator configured to generate a magnetic field;
a substrate on the magnetic field generator;
a superparamagnetic material layer separated from the substrate and magnetized by the magnetic field generated by the magnetic field generator;
a support unit on the substrate, the support unit supporting the superparamagnetic material layer such that the superparamagnetic material layer is separated from the substrate, such that the support unit and the superparamagnetic material layer generate heat by absorbing infrared radiation from the outside; and
a magneto-electric conversion unit configured to generate an electrical signal proportional to both a strength of the magnetic field generated by the magnetic field generator and a magnetization of the superparamagnetic material layer,
wherein the magnetization of the superparamagnetic material layer changes according to a temperature of the superparamagnetic material layer,
wherein the temperature of the superparamagnetic material layer changes according to an amount of the infrared radiation absorbed directly by the superparamagnetic material layer and according to an amount of the infrared radiation absorbed by the support unit, and
wherein the magneto-electric conversion unit is provided on the support unit.

21. The long-wave infrared detecting element array structure of claim 20, wherein the magnetic field generator and the substrate are formed as one body.

22. A long-wave infrared temperature detecting device comprising:
a long-wave infrared detecting element configured to absorb infrared radiation from an outside and detect a first electrical signal that changes according to the infrared radiation;
a signal processor configured to process a second electrical signal transmitted from the long-wave infrared detecting element; and
a display element configured to display an image generated by the second electrical signal processed by the signal processor,
wherein the long-wave infrared detecting element comprises:
a magnetic field generator configured to generate a magnetic field;
a substrate on the magnetic field generator;
a superparamagnetic material layer separated from the substrate and magnetized by the magnetic field generated by the magnetic field generator;
a support unit on the substrate, the support unit supporting the superparamagnetic material layer such that the superparamagnetic material layer is separated from the substrate, such that the support unit and the superparamagnetic material layer generate heat by absorbing the infrared radiation from the outside; and
a magneto-electric conversion unit configured to generate the second electrical signal proportional to both a strength of the magnetic field generated by the magnetic field generator and a magnetization of the superparamagnetic material layer,
wherein the magnetization of the superparamagnetic material layer changes according to a temperature of the superparamagnetic material layer, and
wherein the temperature of the superparamagnetic material layer changes according to an amount of the infrared radiation absorbed directly by the superparamagnetic material layer and according to an amount of the infrared radiation absorbed by the support unit, and
wherein the magneto-electric conversion unit is provided on the support unit.

23. The long-wave infrared temperature detecting device of claim 22, further comprising:
an optical lens configured to focus incident infrared rays from the outside on the long-wave infrared detecting element; an aperture provided between the optical lens and the long-wave infrared detecting element to control an amount of the incident infrared rays reaching the long-wave infrared detecting element; and an optical filter between the optical lens and the long-wave infrared detecting element to selectively transmit the infrared radiation in a specific wavelength band that has passed through the optical lens.

24. A thermal imaging device comprising:
an optical system configured to focus incident infrared rays from an outside;

a long-wave infrared detecting element array structure comprising a plurality of long-wave infrared detecting elements configured to detect the incident infrared rays that have passed through the optical system;
a controller configured to control the plurality of long-wave infrared detecting elements;
a signal processor configured to process an electrical signal transmitted from the long-wave infrared detecting element array structure; and
a display element configured to display an image generated by the electrical signal processed by the signal processor,
wherein each of the plurality of long-wave infrared detecting elements comprises:
 a magnetic field generator configured to generate a magnetic field;
 a substrate on the magnetic field generator;
 a superparamagnetic material layer separated from the substrate and magnetized by the magnetic field generated by the magnetic field generator;
 a support unit on the substrate, the support unit supporting the superparamagnetic material layer such that the superparamagnetic material layer is separated from the substrate, such that the support unit and the superparamagnetic material layer generate heat by absorbing infrared radiation from the outside; and
 a magneto-electric conversion unit configured to generate the electrical signal proportional to both a strength of the magnetic field generated by the magnetic field generator and a magnetization of the superparamagnetic material layer,
wherein the magnetization of the superparamagnetic material layer changes according to a temperature of the superparamagnetic material layer, and
wherein the temperature of the superparamagnetic material layer changes according to an amount of the infrared radiation absorbed directly by the superparamagnetic material layer and according to an amount of the infrared radiation absorbed by the support unit, and
wherein the magneto-electric conversion unit is provided on the support unit.

* * * * *